US012182135B2

(12) United States Patent
Anderson

(10) Patent No.: US 12,182,135 B2
(45) Date of Patent: Dec. 31, 2024

(54) SYSTEM AND METHOD FOR ATHLETE ASSESSMENT AND TEAM SELECTION

(71) Applicant: Neil Anderson, Saskatoon (CA)

(72) Inventor: Neil Anderson, Saskatoon (CA)

( * ) Notice: Subject to any disclaimer, the term of this patent is extended or adjusted under 35 U.S.C. 154(b) by 0 days.

(21) Appl. No.: 17/322,364

(22) Filed: May 17, 2021

(65) Prior Publication Data

US 2021/0311954 A1 Oct. 7, 2021

Related U.S. Application Data

(63) Continuation of application No. 15/003,397, filed on Jan. 21, 2016, now abandoned.

(60) Provisional application No. 62/108,296, filed on Jan. 27, 2015.

(30) Foreign Application Priority Data

Jan. 21, 2015 (CA) ..................................... 2879027

(51) Int. Cl.
*G06F 16/2457* (2019.01)
*G06F 16/23* (2019.01)
*G06F 16/248* (2019.01)
*G06Q 10/06* (2023.01)
(Continued)

(52) U.S. Cl.
CPC ........ *G06F 16/24578* (2019.01); *G06F 16/23* (2019.01); *G06F 16/248* (2019.01); *G06Q 10/06* (2013.01); *G06Q 10/0639* (2013.01); *G09B 19/0038* (2013.01)

(58) Field of Classification Search
None
See application file for complete search history.

(56) References Cited

U.S. PATENT DOCUMENTS 8,579,632 B2 * 11/2013 Crowley ............ A63B 24/0006
434/249
8,584,174 B1 * 11/2013 Fyock ................ H04N 21/4316
725/60

(Continued)

OTHER PUBLICATIONS

Shyamprasad Chikkerur; Objective Video Quality Assessment Methods: A Classification, Review, and Performance Comparison; IEEE; 2011; pp. 165-182.*

*Primary Examiner* — Mariela Reyes
*Assistant Examiner* — Jermaine A Mincey
(74) *Attorney, Agent, or Firm* — Gearhart Law, LLC

(57) ABSTRACT

Subjective and objective assessment attributes and measurements related to athletes are captured in an athlete assessment database. Attributes can be entered and updated by at least one evaluator in the field to the athlete assessment database using a client/server software application and mobile client devices. Following capture of the assessment attributes to assessment attribute records in the athlete assessment database, at least one ranked listing of the athletes is created based on the captured assessment attribute data, for printing, display or further use. Captured assessment attributes with relation to the athletes in question can be averaged, normalized or otherwise manipulated. A drafting interface could be provided to allow for immediate or streamlined team selection in a league. The method enhances the speed and accuracy of team selection and athlete ranking processes, over current paper based processes.

20 Claims, 21 Drawing Sheets

(51) Int. Cl.
*G06Q 10/0639* (2023.01)
*G09B 19/00* (2006.01)

(56) References Cited

U.S. PATENT DOCUMENTS

2013/0079130 A1* 3/2013 Takacs .................. A63F 13/828
  463/31
2013/0266918 A1* 10/2013 Tinjust ............... A63B 24/0087
  700/91
2018/0178106 A1* 6/2018 Campaña Aguilera ......................
  G06Q 10/0639

* cited by examiner

SYSTEM AND METHOD FOR ATHLETE ASSESSMENT AND TEAM SELECTION

CLAIM OF PRIORITY

This application claims priority to U.S. application Ser. No. 15/003,397 filed on Jan. 21, 2016 and U.S. Provisional Patent Application No. 62/108,296, filed on Jan. 27, 2015, entitled "System and Method for Athlete Assessment and Team Selection" and Canadian Patent Application No.: 2879027, filed on Jan. 21, 2015, the contents of all of which are hereby fully incorporated by reference.

FIELD OF THE EMBODIMENTS

This invention is in the field of team sports coaching and administration, and more specifically provides a system and method for the comparative ranking and assessment of athletes in the assembly of teams.

BACKGROUND OF THE EMBODIMENTS

One of the most time consuming and important tasks undertaken in the selection and fielding of a sports team is the assessment of athletes and selection of team members. This issue is the same in the selection of any sport team, including a baseball team, soccer team, hockey team, football team or the like.

As a starting point in the selection of athletes for participation in a sports team there are two categories of key performance indicators for an individual that would be considered by a coaching staff in terms of selecting athletes for inclusion on the team. These are objective key performance indicators which might simply be objective or quantitative measurements of particular physical attributes of an athlete or quantitative measurements of performance in particular drills or skills tests.

Many traditional approaches to athletic assessment and forecasting have focused on game statistics and other objective KPIs in part because of the simplicity of their capture. However, through past experience in the field of athletic assessment and team selection in multiple sports it is believed that a more fulsome team selection result and athletic assessment is generated through a more thorough and subjective assessment and documentation of an athlete's physical performance and potential for performance in a field situation.

The second category of KPIs which are useful from the perspective of taking a deeper look at the potential performance of an athlete in a team setting are to consider various subjective assessments of the athlete in terms of their performance in particular tests or exercises as well as observations of their participation in team drills or scrimmage settings etc. Subjective KPIs, in terms of athletic assessment, are most often gathered by having the athletes in question observed by one or more qualified assessment judges or evaluators, who have experience and training in terms of standardized measurement of the subjective performance indications with respect to a particular athlete in a particular sport. Incorporating these types of qualitative assessments alongside or in place of only quantitative information results in ability to consider a more fulsome picture of each potential team member athlete, individually as well as in aggregate when a team is selected or built—for example certain qualitative as well as quantitative attributes of some athletes will be more important at particular positions on a team than in others.

Typical prior art approaches to the assessment of athletes for potential team selection in sports are based on manual assessment by one or more evaluators. The pool of athletes will be gathered together for one or more tryout sessions, or measurements might be taken in the objective context over time, and the evaluator or evaluators will observe the various athletes in participating in their drills or scrimmage etc. and manually score each of their participation for capture and subsequent ranking and scoring purposes. The manual scoring of the individual athletes in these types of settings is recorded on paper by the evaluator, for subsequent transcription and manipulation.

Where there is a larger pool of athletes to be assessed or where there is a desire for an additional layer of objectivity in the assessment process, multiple evaluators might score of the pool of athletes and then the scores that they capture individually with respect to their observation of athletes participating in various assessment drills are gathered together and averaged or otherwise aggregated and scored for the purpose of consideration of a ranked list of athletes, ranked by ability in a particular skill or otherwise.

Evaluation or assessment scores which are captured in these prior art methods on paper typically have as a follow-on aggregation step the gathering in of the paper score sheets filled out by each evaluator, and the scores provided by each evaluator for each athlete on each KPI or measurement are added up and averaged, or transcribed into a chart or a spreadsheet or the like for additional use. This type of a traditional process which is still widely used results in the need for significant central office help in the aggregation and assessment of the scores, once the physical assessment of the athletes in question has taken place. It is time intensive, and the possibility of even data entry errors when these various scores are transcribed together exists such that crosschecking and verification is also very important to ensure that the scores which have been captured by individual evaluators are properly transcribed into whatever follow-up averaging or scoring system is used.

One of the additional limitations of the current paper-based approaches is the fact that centralized aggregation and transcription of the scores into a spreadsheet or other format is virtually mandatory if it is desired to normalize the results across a number of evaluators or otherwise perform more complicated mathematical comparison and assessment of the athletes in question. If there were an alternate approach to this type of an athlete assessment process which allowed for a streamlined central data entry process which would limit the amount of redundant work to transcribe or reenter the manually captured results from individual evaluators of individual athlete assessments, this would undoubtedly be positively received in the realm of community and semi-professional or even professional sport.

Considering as a single example, the assessment and selection of a community hockey league might include the conduct of individual skills assessments of hundreds of hockey players, for eventual stratification or division into tens of teams in the league. Either for the purpose of assisting coaches in a draft process, or even if in some instances it was desired to automatically select teams based on a ranked skills matrix, it can be seen that the manual capture of various subjective KPI measurements with respect to hundreds of hockey players or athletes in some other similar sport and league, for manual central aggregation and manipulation is in many ways a herculean task. This can also be further complicated by the fact that many of these community leagues at least, even if not in semiprofessional and professional leagues, are run on a not for profit or volunteer basis and so if it is possible to minimize the amount of back office help required, cost savings and process efficiencies can really be realized.

If it was possible to streamline the process to minimize the amount of data entry requirements it might also allow for assessment processes to incorporate additional athletic measurements or assessment KPIs, if the addition of more assessments or calculations would not exponentially increase the amount of back office assistance required to aggregate and rank the final scores.

Many coaches and evaluators in the sports world now use portable computing devices for various purposes on the field—for example tablet computers are often used to demonstrate plays, capture statistics and otherwise assist in the enhancement of the coaching experience for both coaches and athletes alike. The use of these types of devices already in the field means that if there was a system of athletic assessment and evaluation which could incorporate the use of those devices to minimize manual data capture in the athletic measurement of subjective KPIs, this could be well-received as well.

The presence of such devices for data capture purposes in the athletic assessment applications is an obvious benefit to an invention in this area, but also if it was possible in addition to providing the ability to streamline the capture of assessment scores to also provide the ability to using such a device view and manipulate the aggregated information collected from athletic assessment processes this would also be beneficial.

Reliance upon subjective assessment of the performance of athletes by multiple evaluators is believed to retain a very important place in the athletic evaluation and team selection process and it is believed that if it was possible to provide an automated system in the place of current paper-based and manual data capture systems that this would represent a significant technical stride and be well-received in industry.

SUMMARY OF THE EMBODIMENTS

The present invention provides a quick and accurate means of collecting metrics enabling sports team management to make better educated selections and decisions in the selection of an athletic team from an available talent pool. The information captured may also be useful from an ongoing coaching perspective.

As outlined herein, the present invention comprises a novel athlete assessment method, which uses an athlete assessment database hosted on a server operatively connected to a computer network to allow for the enhanced assessment, ranking and team selection of athletes in team sports.

The athlete assessment database in all the embodiments outlined herein comprises at least one project record which contains project parameters including details of assessment attributes to be captured in respect of athletes in a particular athlete assessment project. Where the system and method is to be used to administer or handle more than one asset assessment project, more than one project record would exist in the database, with the project record corresponding to each of the assessment project.

In addition to at least one project record, the athlete assessment database also comprises a plurality of athlete records, each of which is linked to at least one project record and contains athlete particulars corresponding to an athlete. The athlete particulars could be identifying information or other information related to the particular athlete, who is going to be assessed in the asset assessment project. An athlete record could actually be linked to more than one project record, where particular athlete was being assessed in more than one athlete assessment project. All embodiments of the assessment database would also comprise a plurality of assessment attribute records. Each assessment attribute record is linked to at least one project record and to an athlete record and contains at least one captured assessment attribute of the related athlete. As outlined in further detail throughout this document, assessment attributes are measurements of the skill or other ability of a particular athlete in a sport, which are used for ranking and team selection purposes.

The athlete assessment method, which uses an athlete assessment database as outlined above, comprises the following steps in terms of the particular athlete assessment project. The first step is the creation and population of the project record with the project parameters for the athlete assessment project in question within the athlete assessment database. In addition to the creation of a project record with respect to the athlete assessment project, an athlete record needs to be created and populated with respect to each athlete to be assessed in the athlete assessment project—these athlete records would contain corresponding athlete particulars for each athlete.

At least one evaluator would capture and transmit assessment attributes for athletes to the athlete assessment database by an evaluator interface served between the server and at least one client device over the computer network. This could either be done by way of the proprietary software installed on a client device, or the server could be a Web server and the client devices could be wireless devices capable of browsing and/or interacting with content and software on the server—both such approaches will be understood to those skilled in the art.

To make the system and method of the present invention as widely available as possible is primarily contemplated that the client/server web methodology would be used, rather than the need to write and install a proprietary software on a wireless device or client device, although both such approaches would be within the scope of our intended coverage herein.

Following the capture of assessment attributes for particular athlete or athletes via the evaluator interface on the client device by at least one evaluator, and the subsequent transmission of those attributes to the server, the captured assessment attributes will be stored in assessment attribute records in the athlete assessment database, each linked to their respective athlete record and to the related project record.

Following the conclusion of the assessment stage of a particular project in accordance with the method, the final step in the base of the method is to display at least one assessment attribute of all of the athletes associated with the effort assessment project to a user, based upon the assessment attribute records for the asset assessment project stored within the athlete assessment database. Many different types of static or dynamic displays can be contemplated. Data could simply be sorted or could be processed, normalized or further calculated in the presentation of a report, display or dashboard to users. All such approaches to the display of the information, from the most simple to more complicated approaches and dashboards are all contemplated within the scope here.

As outlined above, the general method comprises displaying assembly of assessment attribute information to one or more users following the conclusion of the assessment stage of a particular athlete assessment project. This display step could comprise generating at least one ranked listing of the athletes in the athlete assessment project based upon those assessed attribute records based on one or more of the assessment attributes captured and stored in the database, or could be based upon another calculation-again both such approaches are contemplated to be within the scope of the present invention.

The display of assessment attribute information to one or more users could be done by a screen or display interface, the server or client device, or the output of that information could also be rendered as a printed or otherwise dispatched report or dashboard or the like. It is specifically contemplated that the athlete assessment database will be stored on the server operatively connected to a computer network in communication with the at least one client device required for data entry thereto. In other cases, the server that is operatively connected to network and to the at least one client device, for the purpose of serving evaluator interface and receiving and storing transmissions of captured assessment attribute information from client devices may not directly host the athlete assessment database and the athlete assessment database may be resident on or hosted by another computer that is operatively connected thereto.

Many different types of client devices could be used to communicate with the server in accordance with the method of the present invention. It is specifically contemplated that the most useful types of client devices would be wireless devices capable of two-way network communication with the server via the computer network—for example mobile telephones, tablets or laptop computers. Hardwired devices could also be used although it will be understood to those skilled in the art that the added commercial benefit of wireless device would enhance the likely commercial acceptance of the method outlined herein.

The server would likely contain an assessment software program configured to execute the capture, storage and display of athletic assessment attributes to and from the athlete assessment database from client devices of evaluators the assessment software program itself could take many forms as outlined in further detail herein and any type of an assessment software program which has the practical effect of accomplishing the method of the present invention is considered to be within the scope hero.

Client software on the at least one client device would communicate with the evaluator interface and other server-side software components of the server, in order to allow the viewing of athlete particulars from athlete records in the database, and the data entries assessment attribute information for storage to the athlete assessment database during the assessment stage. Again as outlined above, the client device might include purpose built client software capable of communicating with the server and the remainder of the software the present invention by the computer network, or the server may communicate with the client device and the evaluator or other party operating same via a browser interface. All such approaches are contemplated herein.

The evaluator interface which is presented to an evaluator on a client device during the data entry stage of the method could show the athlete particulars and provide the ability for viewing and data entry access to the data of more than one athlete at the same time. Alternatively interface or display screen could provide access to only the data entry or profile of a single athlete at one time. All such approaches are contemplated within the scope hereof. It is specifically contemplated that one or more athlete assessment projects could be administered in accordance with the method and through one embodiment of the system of the present invention—a service bureau approach with more than one project record within the database is contemplated to be the most likely commercially acceptable successful method. In cases with a number of project records is more than one, the evaluator interface could allow an evaluator to select the correct athlete assessment project and related data center reviewing and data entry.

The athlete particulars with respect to individual athletes which will be saved in the athlete records in the athlete assessment database would likely contain physical identification of an athlete, to ease identification of the athlete during an assessment stage of a particular assessment project—for example uniform number, color or the like. Some or all of the athlete particulars from the corresponding athlete record for the athlete could be displayed to an evaluator during their use of the value for data entry purposes.

In a more elaborate embodiment of the system and method of the present invention the athlete assessment database could also include a plurality of assessment template records, each of which comprises the necessary project parameters to allow for the systemized based upon preset system settings, whereby an operator could rapidly and consistently create multiple project records for similar athlete assessment projects. This would allow for the development of best practice assessment templates and related assessment template records which could be offered by the vendor of the service and method of the present invention to clients who may not all have the resources available to maintain, monitor and enhance their own templates.

Beyond providing a centrally managed template set or plurality of assessment template records which the vendor of the system could maintain, it may also in certain other embodiments be desirable by a particular customer using the system and method of the present invention to create an assessment template record with respect to their preferred approach to a repeated athlete assessment project within which vendor take, whereby they could upon development of their own templates save it for reuse.

Finally as outlined with respect to certain embodiments of the method of the present invention, in addition to the fact that various types of data displays and reporting could be used at the tail end of the method of the present invention, including the incorporation of a query and reporting module into the assessment software program itself, the athlete assessment method might also include a drafting step following the conclusion of the assessment step, whereby the number of athletes which are assessed in an assessment project is sufficient to populate a plurality of sports teams and following the conclusion of the assessment stage of the method, the display of at least one assessment attribute all of the athletes associated with the athletic assessment project to user comprises displaying assessment attribute records for the athlete assessment project store within the athlete assessment database to at least one coach for each of the sports teams, and then providing a drafting interface whereby the coaches of those sports teams could assign particular athletes to particular sports teams by making a selection which will be transmitted back to the server and saved in the database along with the remainder of the information from the athletic assessment project.

In addition to the asset assessment method of the present invention there is also disclosed a athlete assessment system for the conduct of the assessment method outlined. The athlete assessment system comprises an athlete assessment database as outlined above, with the server connected to the athlete assessment database and to a computer network by which the server can communicate with at least one client device. This system can facilitate the execution of the athlete assessment method by, for a particular athlete assessment project, creating and populating a project record with the project parameters of the athleticism project within the asset assessment database; creating and populating an athlete record with corresponding athlete particulars for each athlete in the athlete assessment project in the asset assessment database; and during the assessment stage of the athlete assessment project serving evaluator interface to the client device at least one evaluator to enable data entry at the client device of assessment attributes for athletes. Upon receipt of transmissions of assessment attribute data from the client devices of evaluators, assessment attribute records are created within the asset assessment database to store same, each assessment attribute record being linked to their respective athlete record into the related project record. Finally, as outlined with respect to the method outlined above, following conclusion of the assessment stage at least one assessment attribute of all the athletes associated with the athlete assessment project will be displayed to the user based upon the assessment attribute records for the athlete assessment project stored within the athlete assessment database.

The system of the present invention would be capable of communicating and operating with numerous types of client devices specifically contemplated that the client devices which might be used to build wireless devices capable of communicating with the server via the computer network.

One or more athlete assessment projects could be administered simultaneously in accordance with system of the present invention.

The system could be enhanced by providing a data set comprising a plurality of assessment template records in the database, which would allow for the system eyes selection creation of project records and the athlete assessment database based upon preset system settings. As outlined with respect to the method above, the athlete assessment system of the present invention can also comprise the necessary software to conduct a drafting step following the conclusion of the assessment phase of a particular athlete assessment project, whereby players who were assessed could be assigned to a plurality of sports teams.

In addition to the system and method outlined herein, there is also outlined computer software for operation of the server to affect the method of the present invention.

BRIEF DESCRIPTION OF THE DRAWINGS

To easily identify the discussion of any particular element or act, the most significant digit or digits in a reference number refer to the figure number in which that element is first introduced.

FIG. 13 is a sample screenshot of an alternate embodiment of an evaluator interface in accordance with the present invention;

FIG. 14 is a sample screenshot of an alternate embodiment of an evaluator interface in accordance with the present invention;

FIG. 15 is a sample screenshot of an alternate embodiment of an evaluator interface in accordance with the present invention;

FIG. 16 is a sample screenshot of an alternate embodiment of an evaluator interface in accordance with the present invention;

FIG. 17 is a sample report demonstrating data output from one embodiment of the athlete assessment system, showing data generated for the assessment attributes of a single athlete;

DESCRIPTION OF THE PREFERRED EMBODIMENTS

Figure 1:
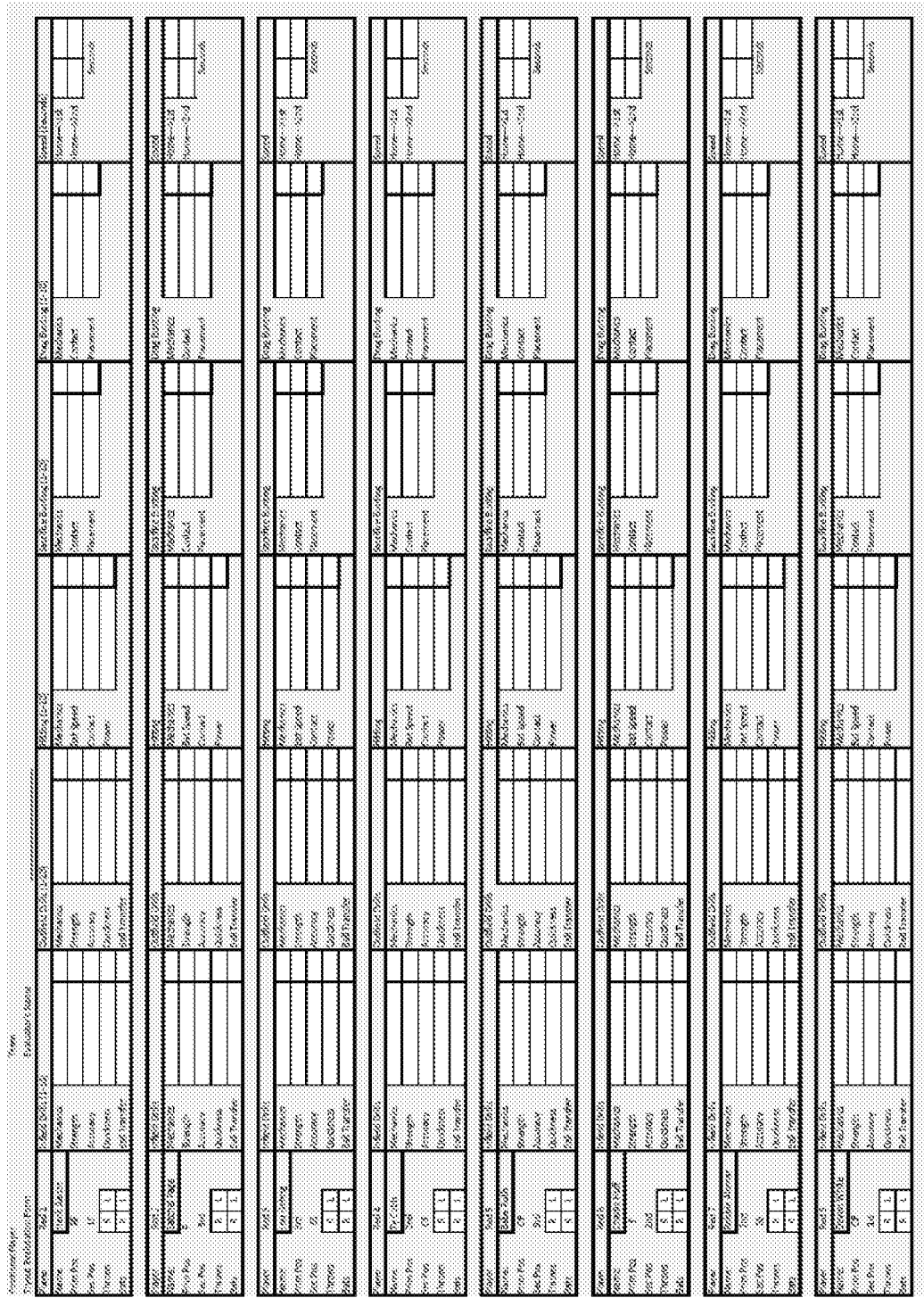
FIG. 1 illustrates a sample of a prior art assessment scoresheet used in a manual athletic assessment and team selection method.

As outlined above the general focus of the present invention is to provide an enhanced athlete assessment method and athlete assessment system. By capturing one or more athletic assessment attributes in relation to a plurality of athletes from at least one evaluator with respect to an athlete's performance in an evaluation session to a central database, enhanced reporting and ranking ability for that information is provided and the amount of back office labour assistance required in this process is significantly reduced if not eliminated altogether. The method will allow for the generation of ranked listings and data reporting for coaches or team admins selecting teams, as well as providing the background metrics required for a drafting interface to further automate the selection of teams in a sports league.

Athletic Assessment Attributes and Methodology:

As outlined elsewhere herein, there are two types of athletic assessment attributes which it might be desired to track and present to a coaching staff in terms of ranking or selecting athletes for participation in a sports team or sports league. These have been categorized as objective assessment attributes and subjective assessment attributes.

Objective assessment attributes in terms of an athletic assessment are intended to encompass any type of a measurement or score of some assessment attribute of an athlete which it was desired to reflect or consider in an athlete assessment method which was not the subject of any kind of subjective judgment by one or more evaluators. For example the time required by an athlete to run a particular distance, the amount of weight they could lift, or measurements of certain body or performance tests are samples of some types of objective assessment attributes which might be desired to be considered alongside or in conjunction with subjective assessment attributes in the assessment, ranking and selection of athletes for participation in sports teams. Typically these objective assessment attributes can be measured once, as indicated without the need for subjective judgment or assessment by an evaluator.

In the athlete assessment method contemplated herein, objective assessment attributes could be captured or gathered either directly from athletes or by the assessment staff involved in the athlete assessment method, and can be entered into the system in association with the profile of a particular athlete and then used for the purpose of reporting in the remainder of the method of the present invention.

The second type of athletic assessment attributes which are described herein are subjective assessment attributes. These are athletic assessment attributes which would be captured by the application of selective and subjective judgment criteria by at least one evaluator in observation of a particular athletic performance by an athlete. More exhaustive athletic assessment routines quite often involve subjective assessment by at least one evaluator of the performance of one or more athletes, and those subjective assessments are then captured for comparative purposes. For example, the various types of subjective assessment attributes which might be captured are often captured in relation to a scale—with a view to by using a scale standardize or normalize the data to a degree in respect of multiple athletes considered—and the subjective judgments made by the at least one evaluator in respect of that scale with respect to one or more subjective assessment attributes are then captured for subsequent aggregation and scoring or ranking or selection purposes. Subjective assessment attributes might include any number of different types of observations by evaluators—for example an evaluator might have a scorecard of a number of different skills which it was desired to provide marks or assessments of in respect of athletes and in respect of each of those skills, based upon the judgment of the evaluator, they might select from a scale—for example assigning a score between one and five or something along those lines—with respect to the ability of a particular athlete with respect to a particular skill or quality—this type of a subjective judgment and the assignment of a subjective score is a subjective assessment attribute for the purposes of the remainder of this application.

It will be understood by those skilled in the art of athletic assessment that there are virtually limitless types of both objective assessment attributes and subjective assessment attributes which might be used in accordance with the athlete assessment method and athlete assessment system of the present invention. The athlete assessment system could be modified to accommodate any type of such attributes and all such approaches are contemplated within the scope of the present invention.

Evaluators:

One of the key components of prior art manually oriented athletic assessment regimens, as well as still at the heart of the athlete assessment method of the present invention, are the actual human evaluators who will view and evaluate the performance of athletes for the purpose of assessing and assigning subjective assessment attribute values. Typically what is done in an athlete assessment method such as is contemplated to be replaced by the method of the present invention is that a templated number of athletic performance exercises or drills are executed by the athletes, and they are graded on their performance in those drills by at least one evaluator.

The method of the present invention could be employed by a single evaluator, or can also be employed in a case where multiple evaluators were each capturing scores on some or all of the subjective assessment attribute of the athletes. In some cases multiple evaluators are used and their scoring is averaged or otherwise normalized to come up with a most accurate or balanced subjective assessment attribute score for the athletes in question on each of the drills in question.

It is specifically contemplated that the athlete assessment method herein can be practised either by a single evaluator, or can also encompass assessment of athletes by more than one evaluator. It might also be the case that a single evaluator performed more than one assessment of the athlete over time, which we would treat as multiple assessments or evaluators as well for the purpose of understanding the application of the method of the present invention thereto.

The evaluators would typically be subject matter experts in the sport or athletic exercise being assessed. Typically where a plurality of evaluators was to be used, they would have some understanding between the group of them of the grading scale used for the various subjective assessment attributes to be scored and captured, so that they would manually normalize things to a degree. This is also how things would have been done in the past with manually based scoring regimes—in either a prior art manual approach, or even in the method of the present invention, each of the plurality of evaluators would view the performance of the athletes, and assign subjective assessment attribute scores to the various exercises or drills or measurements that they are instructed either by a manual card or electronic data capture athlete assessment system such as outlined herein to capture.

It will be understood by those skilled in the art of database programming that an athlete assessment system for the practice and implementation of the present invention could be deployed which would either optimize the approach and methodology for a single evaluator, or for multiple evaluators. All such approaches are contemplated within the scope of the present invention.

PRIOR ART

For the purpose of fully comprehending the significant technical benefit of the present invention, we first demonstrate a basic prior art athlete assessment method, for the purpose of demonstrating the technical distinction and superiority of the invention.

FIG. 1 shows an extract of a prior art manual scoring sheet or a spreadsheet which can be used in the assessment or assessment of athletes and team selection projects. A plurality of evaluators will review the performance of various athletes in the set of drills or skills outlined in the scoresheet and will assign objective or subjective attribute scores to them. There is shown an extract from a manual athlete assessment scoresheet, which is used to perform a assessment of an athlete for assessment and ranking or in team selection exercises for team sports. A scoresheet would be filled out by at least one evaluator with respect to each athlete who was participating in a particular athletic assessment or evaluation exercise.

The first piece of information outlined on the scoresheet which can be seen are athlete particulars for the athlete in question. This might just be identifying information such as the name of the athlete, contact details, jersey number or the like. Basically this is the information that would be used to describe or identify the athlete who is ranked by the scores indicated on the scoresheet.

The next item outlined on this sample of a manual athlete assessment scoresheet are a plurality of objective assessment attributes. Objective assessment attributes are any type of a attribute which can be quantitatively or otherwise objectively measured with respect to an athlete-weights, measurements, times etc. Objective assessment attributes form the first layer of assessment attribute information which can be gathered with respect to athletes for the purposes of assessing a group of athletes and selecting a sports team based on their abilities, for participation in a particular organized team sport.

The third category of information outlined in the scoresheet, in addition to the athlete particulars and objective assessment attributes are a plurality of subjective assessment attributes. The subjective assessment attributes are grades or subjective assessments of the abilities of the athlete in question, based upon a scale or a preselected and standardized marking strategy. Basically one or more evaluators in reviewing the performance of the athletes in question when filling out the scoresheets will assign a subjective grade to the performance of each athlete on their related scoresheet. Each evaluator will presumably exercise a standardized discretion in assigning scores to individual athlete, such that the subjective assessment attribute scores which are assigned to each athlete on their respective scoresheet by the same evaluator will be generated based on the same mental scale and score. Where more than one evaluator is involved in the parallel assessment of the same group of athletes, each evaluator will be in all likelihood trained to the standard that is selected for use across all of the scoresheets and all of the athletes by all of the evaluators.

Following the completion of the assessment of each athlete by the evaluators, a scoresheet would be in a completed state with respect to each athlete's performance including indications of both their objective assessment attributes and subjective assessment attributes. The score sheets would be aggregated, and the scores included therein would be transcribed into a centralized spreadsheet or the like for the purpose of seeing comparative marks provided by different evaluators and/or averaging the outcomes etc.

Figure 2:
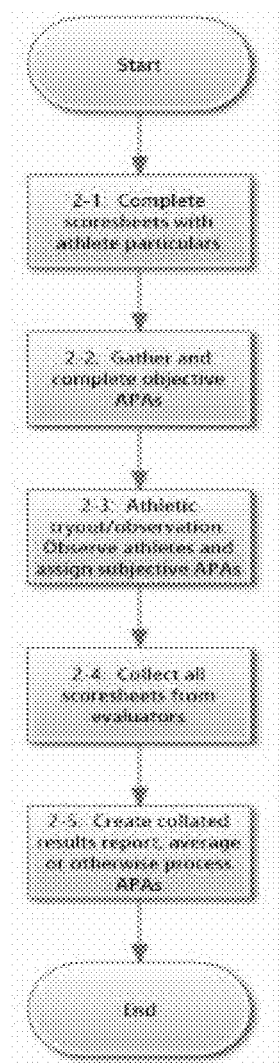
FIG. 2 is a flowchart demonstrating the basic steps in a manual prior art athlete assessment method, for comparative purposes.

To provide further background around the prior art methods of manual athlete assessment and evaluation for ranking and team selection we provide a flowchart in FIG. 2 which outlines one embodiment of a prior art manual athlete assessment method, using a scoresheet such as is shown in FIG. 1. In this one prior art embodiment of a manually driven athlete assessment method, step 2-1 shows the completion of the basic scoresheet information with respect to each athlete who is to be evaluated. The athlete particulars would typically be filled in on the scoresheet form for the purpose of identifying each athlete as the paperwork was generated for use by the evaluators.

Shown at 2-2 is the gathering and completion of objective assessment attribute information on the scoresheet with respect to an athlete. Objective assessment attribute information would typically only need to be gathered once in respect of an athlete and subjective assessment would not be involved in that—as such, the collection of that type of an information feed would typically take place at the front end of a training camp or assessment session or the like. Following the completion of that objective assessment attribute information on the scoresheet with respect to each athlete, a copy of these partially completed score sheets would be made for each evaluator who was to participate in the subjective assessment and grading process.

The next portion of the athletic tryout or assessment session would be conducted, shown at 2-3—scrimmage, drills or the like, where the evaluators who were tasked with subjectively evaluating various athletic assessment attributes with respect to each athlete would observe the athlete and would assign those subjective assessment attribute grades to each assessment attribute heading on the scoresheet, so that each evaluator would complete their assessment scoresheet with respect to each athlete.

Following the completion of the athletic tryout or observation and the completion of all of the assessment attribute information in the score sheets with respect to each athlete, the score sheets would be collected with respect to each athlete from each evaluator—the collection or collation of the actual forms is shown in step 2-4. The central or back office who had collected all of this information would then aggregate the information typically by transcribing the individual scores provided by each evaluator into some type of a collated results report. Scores might be averaged or otherwise normalized with respect to the subjective assessment attributes. The completion of a collated results report, at 2-5, would yield a document which could be used in basic terms for group oriented assessment of the number of athletes who were viewed as potential team members in the selection of a team or for other purposes.

A collated results report being prepared manually or on paper is problematic from a number of perspectives, not the least of which is that typically in order to resort that chart for the purpose of ranking individual athletes in the group on multiple different athletic assessment attributes, the form might need to be manually regenerated each time. This is a significant limitation to the ability to use such a system in the streamlined ranking, assessment and selection of athletes.

General Method Overview:

The athlete assessment method of the present invention uses a client/server hardware and software system to collect objective assessment attributes and subjective assessment attributes pertaining to athletes within an athlete assessment project. The specific purpose for this is typically to allow for analysis and ranking of various athletes in the selection of sports teams. From a high level, the method comprises the following steps in some basic embodiments.

In order to conduct the athlete assessment method of the present invention, an athlete assessment database is required. As outlined elsewhere herein an athlete assessment database 7 comprises at least one project record corresponding to an athlete assessment project-being the overall project of assessing a particular group of athletes for team selection or other similar evaluation purposes. The at least one project record would each contain project parameters related to a particular athlete assessment project, including details of assessment attributes to be captured in respect of athletes in the athlete assessment project.

In addition to at least one project record, the athlete assessment database also contains a plurality of athlete records, each corresponding to an athlete being assessed in an athlete assessment project. Each athlete record is linked to at least one project record (a athlete could be assed in more than one athlete assessment project and the same athlete record could be used for all assessments of the same athlete dependent upon the desire or design of the remainder of the system). Each athlete record contains athlete particulars corresponding to an athlete-name, age, weight other characteristics etc. as outlined herein.

The athlete assessment database also contains a plurality of assessment attribute records, each of which corresponds to a particular captured assessment attribute of an athlete in an athlete assessment project. Each assessment attribute record is linked in the athlete assessment database to an athlete record and to at least one project record.

The athlete assessment database would typically be hosted on a database server connected to a computer network in operative communication with at least one client device—the hardware architecture of the athlete assessment system of the present invention is outlined in further detail below.

Figure 3:
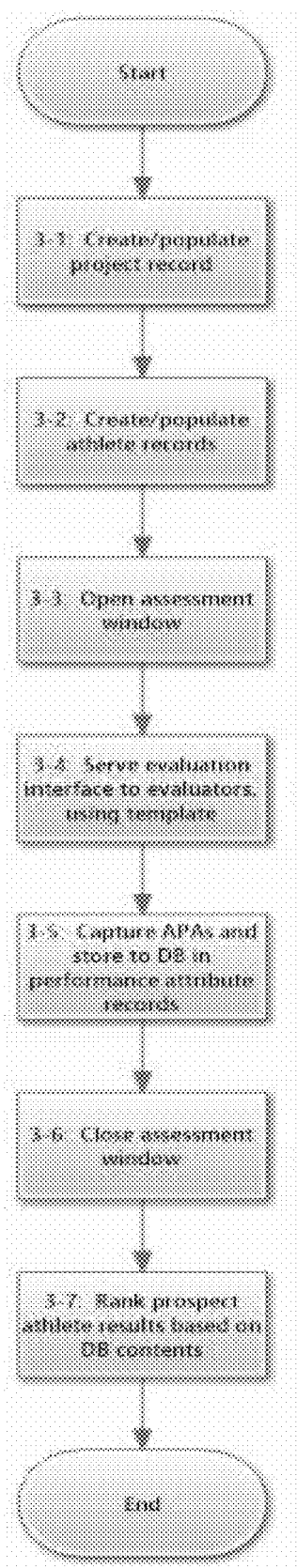
FIG. 3 is a flowchart demonstrating the basic steps in one embodiment of the athlete assessment method of the present invention.

FIG. 3 is a flowchart demonstrating the steps of a first embodiment of the athlete assessment method of the present invention. An athlete assessment database as outlined above, containing at least one project record, a plurality of athlete records and capable of containing a plurality of assessment attribute records linked thereto is used. The details of sample embodiments of the server, athlete assessment database and client devices are outlined in further detail below.

The first step in the athlete assessment method is to create or populate a project record in the athlete assessment database, containing the necessary parameters to adminster an athlete assessment project. This would include details of assessment attributes to be verified or measured, scales for measurement, details of evaluator methodology etc. Creation or verification of the project record corresponding to an athlete assessment project is shown at Step 3-1.

The next step in the method, shown at 3-2, would be the population of the athlete assessment database with athlete records containing athlete particulars for each athlete to be assessed in the particular athlete assessment project. The athlete particulars 2 would be identifying information of athletes to be evaluated in accordance with the remainder of the method. It could also be possible to capture objective assessment attribute data and create related assessment attribute records for those objective assessment attributes directly from the athlete and otherwise at this stage, in advance of subjective assessment of the athletes—it will be understood that the capture of objective assessment attribute or even subjective assessment attribute data and the creation of related assessment attribute records could be done at any time in this stage of the athlete assessment method and all such approaches are contemplated within the scope of the present invention. Both the project record and the athlete records for a particular athlete assessment project could physically be created via an interface on client devices in poerative communication with the server, or by an alternate user interface operatively connected to the athlete assessment database.

The server hosting the athlete assessment database would upon opening of the athlete assessment exercise or drills and the like, shown at Step 3-4, serve an evaluator interface to at least one client device 10 from the server 6, by which each evaluator can enter each required subjective assessment attribute 4 with respect to a particular athlete and their performance into the client device 10, for subsequent transmission back to the server and storage in the athlete assessment database. Evaluators could be required to score each athlete on each necessary subjective assessment attribute, or in other embodiments, it could be possible for evaluators to optionally participate only in grading athletes on certain of the indicators required. Both such approaches are contemplated within the scope hereof. Serving this evaluator interface to the client devices 10 of evaluators is shown at step 3-4, and the capture and subsequent storage back to the athlete assessment database of assessment attribute information is shown at step 3-5.

At the closing of the assessment exercises for athletes, shown at step 3-6, software on the server would create at least one ranked listing of the athletes based upon the information captured. No centralized manual data entry, collation, normalization etc. would be required. This would represent a substantial enhancement over the current state-of-the-art.

Following the creation of at least one ranked listing of the athletes graded in the athlete assessment project, the at least one ranked listing could be displayed, printed or otherwise provided to a user via a client device or otherwise.

Figure 4:
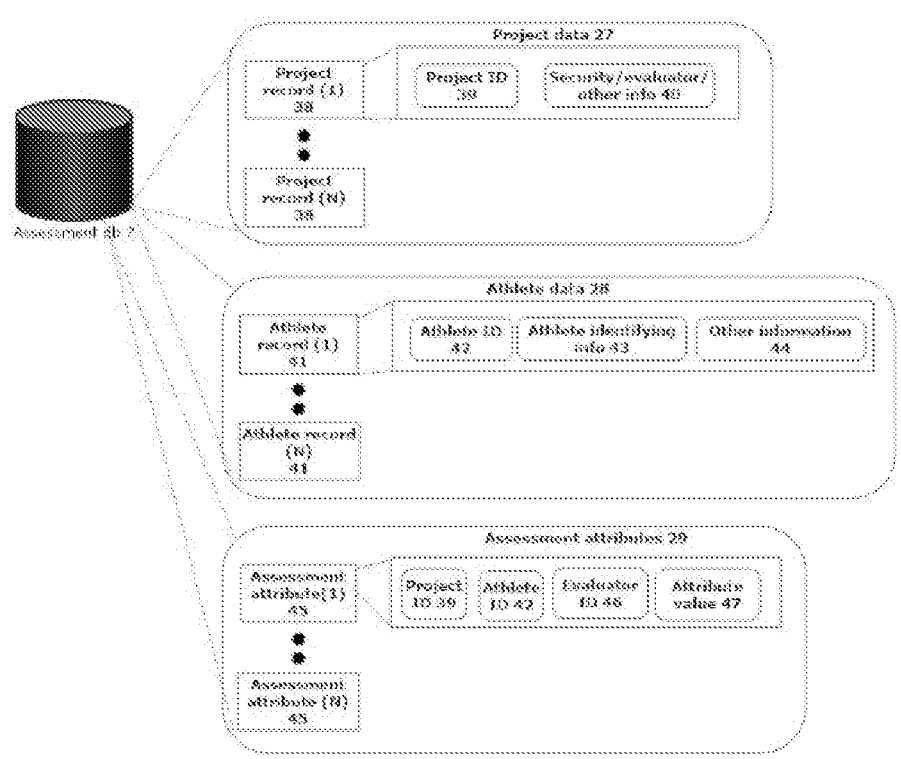
FIG. 4 is a schematic drawing of the data structure of one embodiment of an athlete assessment database in accordance with the present invention.
Figure 5:
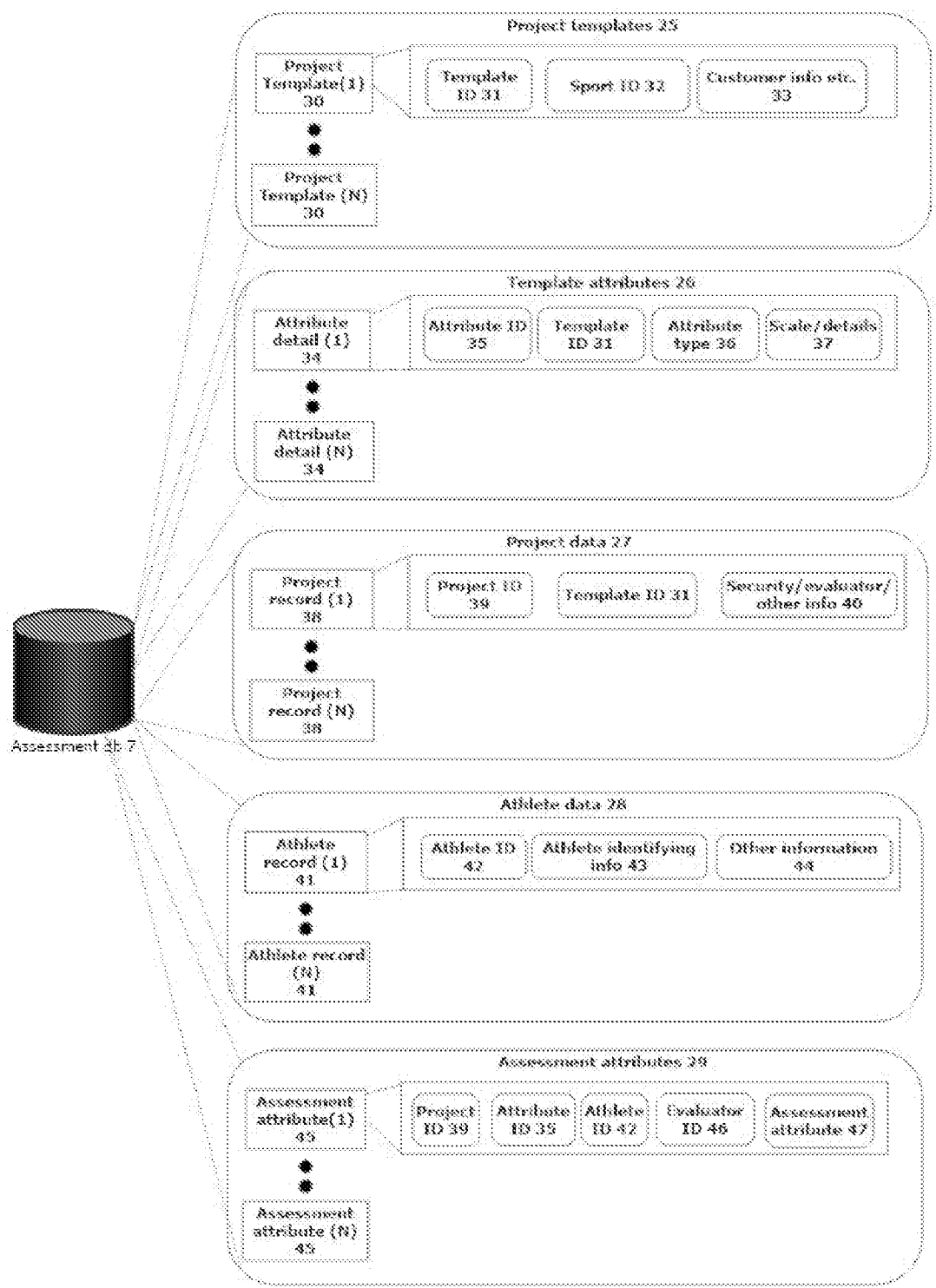
FIG. 5 is a schematic drawing of the data structure of another embodiment of an athlete assessment database in accordance with the present invention.

Athlete Assessment Database:

The key physical aspect of the method which is required for its practice is a central athlete assessment database 7 in which athlete particulars, athlete particulars and other related records pertaining to various athletic assessment details related to athletes assessed within an athlete assessment project are stored. FIG. 4 and FIG. 5 are schematic drawings showing sample data structures of two embodiments of an athlete assessment database in accordance with the present invention.

The athlete assessment database 7, as shown in FIG. 4 contains a number of subsets of data and information which would be used in the execution of the method or operation of the system of the present invention. There is shown a project dataset 27 which could include a plurality of project records related to athlete assessment projects being administered or executed using the system of the present invention, an athlete data subset 28, which would contain an athlete record in respect of each athlete being assessed in an athlete assessment project, and a performance attribute subset 29 which would contain the assessment attribute values captured by evaluators and recorded in the system.

Shown is a project data subset 27 comprised of a plurality of project records 38, each of which project records 38 would correspond to a particular athlete assessment project. There is shown a project identifier or record key 39. Effectively project record 38 would contain all of the high level project identifying information and other paramters required for the remainder of the athlete assessment system to facilitate eecution of an athlete assessment project—for example have log in credentials provided to users, security being assigned appropriately at a project level etc., assessment attributes to be tracked and parameters for same etc. In some embodiments there might be only one project record 38—if the athlete assessment system was to be used only for the administration of a single athlete assessment project. In other embodiments including offering the service as a service bureau of sorts to multiple users, multiple athlete assessment projects to be administered would require the creation of a corresponding plural number of project records.

The next data subset stored within the assessment database 7 is an athlete data subset 28. The athlete data subset 28 would contain a plurality of athlete records 41—the athlete records 41 would each correspond to an athlete who it was desired to assess within one or more athlete assessment projects. As shown each athlete record 41 would contain some type of an athlete identifier or a record key 42, athlete identifying information 43 for reporting or interface purposes—for example name, address, jersey number, or the like which could be used to identify particular athletes on the drafting interface or the evaluator interface, or any other information 44 which was desired to be captured for reporting purposes or for the purpose of normalization or other data processing of captured attribute values etc. It may also be the case that the other information 44 which was stored with respect to a particular athlete record 41 related to a set of security or a log in credentials if it was desired to any way provide athlete access to the contents of the assessment database 7 corresponding to that athlete.

The final data subset shown in the database 7 of this Figure is a performance attribute subset 29. There are shown a plurality of assessment attribute records 45—each of which is linked to an athlete record 41 and a project record 38. Each assessment attribute record 45 could contain firstly a project ID 38 which would connect a captured value to a particular athlete assessment project—as well as an attribute ID 35 and an athlete ID 42. This would basically allow for the cross-referencing or a connection of the captured attribute value 47 to a particular athlete in respect of a particular attribute in a particular athlete assessment project. Also, there could be an evaluator ID 46 or other information related to the actual evaluator capturing the value in the record. In this particular type of a design, there would be a separate assessment attribute record 45 in respect of each attribute for each evaluator who captured a number or value. In other approaches, where more than one evaluator captures a value for an assessment attribute in respect of an athlete, those multiple values could be stored in the same assessment attribute record.

Various types of data structures could be used in an athlete assessment database 7 in accordance with the software and method of the present invention and these will be understood to those skilled in the art. Any type of a data structure capable of storing the various athlete, project and attribute data outlined herein which is required for the execution of the remainder of the system and the method of the present invention in conjunction with the remainder of the software and hardware combination outlined herein will be within the scope hereof. The athlete assessment database 7 might be resident on the server 6 or might alternatively be resident on or administered remotely within some type of a server farm or database environment which was operatively connected for communication with the server 6. The athlete assessment database 7 might also comprise multiple databases or files, rather than a single data file or structure. The particular construction or data structure of the athlete assessment database 7 might also depend upon the infrastructure design of the remainder of the athlete assessment system of the present invention-again the various aspects of the athlete assessment system, its structure and the athlete assessment database 7 including those which are infrastructure dependent will be understood to those skilled in the art of relational database and client server system design.

It is specifically contemplated that the athlete assessment database 7 would most likely comprise a SQL database running on the necessary database server platform. Other tools and development environments could also be used however.

The embodiment of FIG. 5 shows another approach to an athlete assessment database 7 containing two additional data subsets, outlined and referenced in further detail below. These are an athlete assessment template subset 25 and a template attribute subset 26 which would contain the details of various athletic assessment attributes which were to be tested or recorded in respect of certain templates and projects. These additional subsets, as outlined elsewhere herein, are contemplated as one type of data structure which would allow for the rapid deployment and configuration of project records on the athlete assessment system of the present invention for particular types of athlete assessment projects etc. (i.e. there could be a template setup for use with hockey, soccer, baseball etc., or individual users might even in certain circumstances through the remainder of the software of the athlete assessment system be able to configure and store their own "presets" or templates for particular types of athlete assessment project (ie. a particular baseball league could store a template for their desired type of assessment attributes and other project parameters for athlete assessment projects, for rapid deployment when a new athlete assessment project is desired.

The project template data subset 25 could store multiple templates for the assessment of multiple types of athletes either in multiple leagues, multiple sports or the like. This type of a service bureau approach is considered to be the most commercially viable in terms of widespread adoption of the athlete assessment system of the present invention. However, as outlined herein, rather than a service bureau approach, embodiments of the athlete assessment system of the present invention could also be built which contained only a single template for repeated assessment using the same methodology every time and both such approaches are contemplated within the scope hereof.

As shown in FIG. 5, a project template dataset 25 would be comprised of a plurality of project template records 30. Each of those project template records 30 would include a template ID or database key 31, along with other fields which could be used for the matching of those templates with customers or uses—for example there is shown a sport ID 32, where for example the system might contain multiple templates for use in the assessment of athlete in multiple sports, and other various selection info and fields could also be included as shown at 33.

To conduct an athlete assessment project, a template record 30 would need to be associated with that athlete assessment project and the template record 30 would in turn allow for the proper connection and linkage of different attribute profiles etc. to the project and for use by the evaluators in the execution of that athlete assessment project.

The second data subset which is shown and which is useful from a template perspective is a template attribute subset 26. In certain embodiments the design of the athlete assessment database 7 would include 1 or more tables which related to particular athletic assessment attributes which would be desired to be tracked in respect of athletes on particular types of projects or on particular templates and particular sports. There is shown in this Figure a plurality of attribute detail records 34, each of which includes as shown an attribute identifier or a record key 35 and at least 1 template identifier 31 which would link that particular template attribute to at least 1 project template record 30. It is possible that a single template attribute and its related attribute detail record 34 could actually be connected to more than 1 template record 30 which would allow for use of the same type of attribute testing in more than 1 template, for more than 1 sport or in more than 1 project. This will be an obvious modification to those skilled in the art of database design.

Similar to the embodiment of FIG. 4, also shown is a project data subset 27 comprised of a plurality of project records 38, each of which project records 38 would correspond to a particular athlete assessment project. There is shown a project identifier or record key 38, a template identifier 31 which could connect the project record to a particular project template and its related project template record 30—for the purpose of identifying the relevant template attributes and attribute detail records 34 for use in the rendering of input or output interfaces etc., and other various security or evaluator info etc. 40 could also be stored in that project or in the dataset related to that particular project record 38. Effectively the project data and the project record 38 would contain all of the high level aggregate project identifying information which would be used to for example have log in credentials provided to users, security being assigned appropriately at a project level etc.

The athlete data subset 28 would contain a plurality of athlete records 41—the athlete records 41 would each correspond to an athlete who it was desired to assess within 1 or more projects. As shown in the Figure, each athlete record 41 would contain some type of an athlete identifier or a record key 42, athlete identifying information 43 for reporting or interface purposes—for example name, address, jersey number, or the like which could be used to identify particular athletes on the user interface at the system, or any other information 44 which was desired to be captured for reporting purposes or for the purpose of normalization or other data processing of captured attribute values etc.

The final data subset shown in this Figure is a performance attribute subset 29. Each assessment attribute record 45 could contain firstly a project ID 38 which would connect the eventual captured value to a particular project—as well as an attribute ID 35 and an athlete ID 42. This would basically allow for the cross-referencing or a connection of the captured attribute value 47 to a particular athlete in respect for particular assessment attribute in a particular athlete assessment project. In this particular type of a design, there would be a separate attribute value record 45 in respect of each attribute for each evaluator who captured a number or value.

Also shown with respect to each attribute detail record 34 is an attribute type 36 which it is contemplated would be an indicator on the system of whether the particular attribute detail record 34 related to an objective assessment attribute or a subjective assessment attribute-since objective assessment attributes as outlined in the remainder hereof would require only a single capture or entry on the system, whereas subjective assessment attributes would need to have a value captured in respect thereof by each evaluator involved in the project. Finally, other information related to the particular assessment attribute being tested including for example labels which might be used on drafting interface or evaluator interface screens and reports, the subjective scale values which can be entered by an evaluator in an assessment etc. could all be stored, shown at 37—basically the attribute detail record 34 would contain all the necessary information for a dynamic rendering of an interface or a report which would properly identify, capture or contain the value of the particular attribute in question for a particular type of template or project.

Figure 6:
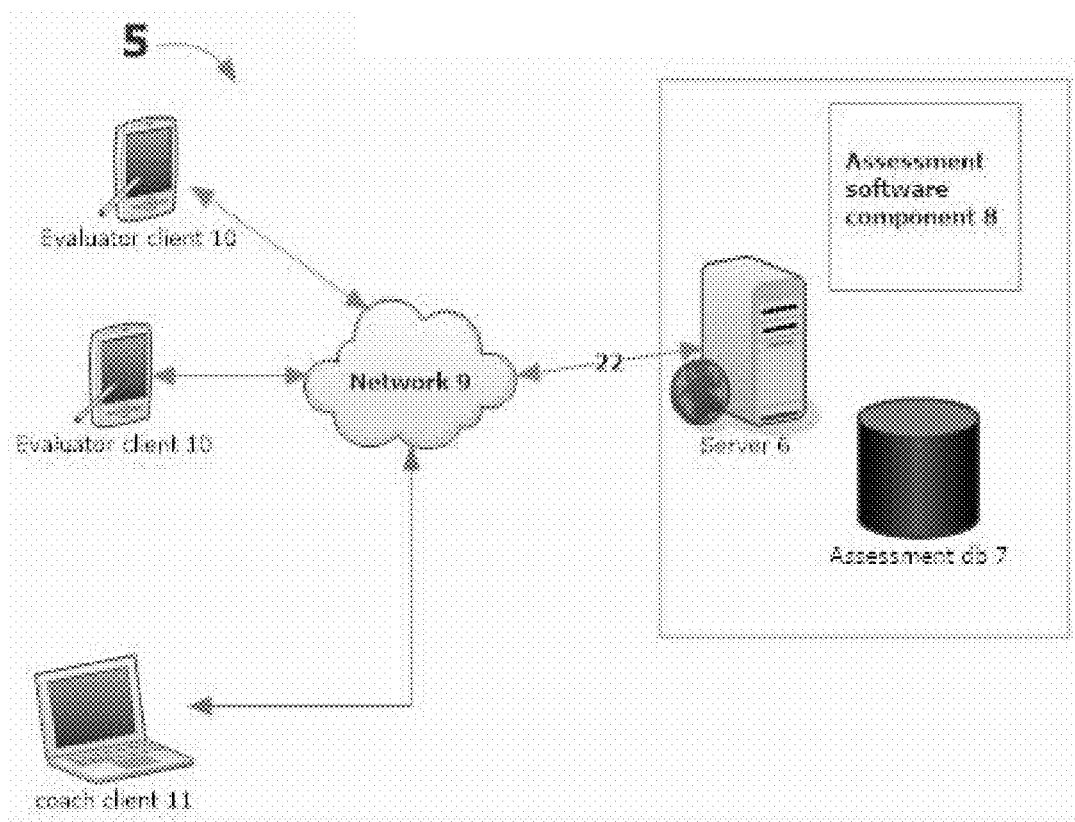
FIG. 6 is a schematic diagram of one embodiment of an athlete assessment system in accordance with the present invention.
Figure 7:
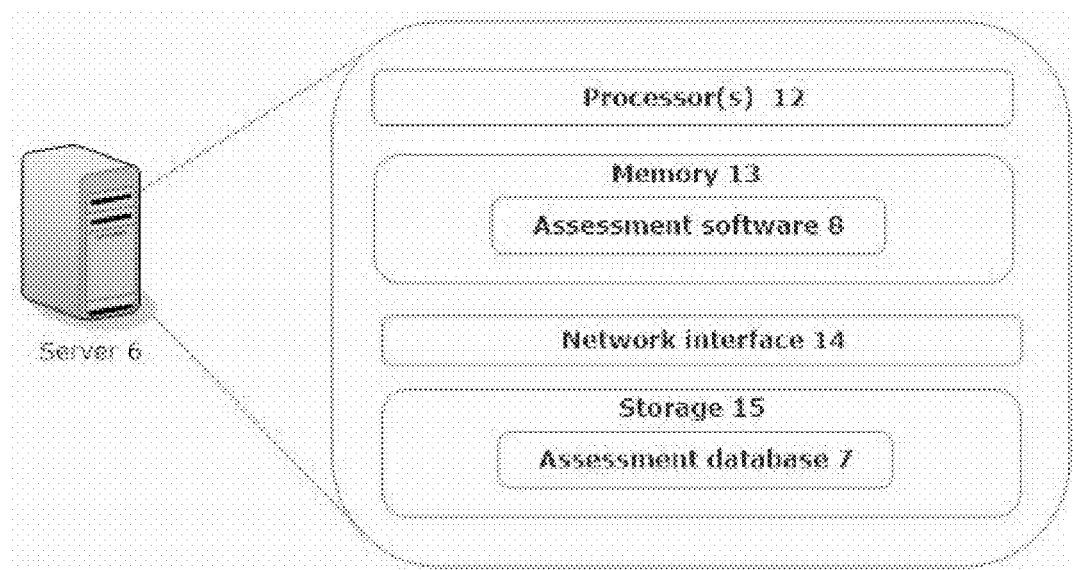
FIG. 7 is a schematic embodiment of the components of one embodiment of a server in accordance with the present invention.

Illustrative Environment and System Architecture:

FIG. 6 is a schematic diagram showing one embodiment of a system architecture in accordance with the present invention, namely a client/server method and apparatus for the streamlined gathering and consumption of subjective assessment attribute information with respect to a plurality of athletes.

In this particular Figure, there is shown a server 6 which is involved in the method of the present invention and which is operatively connected to a computer network 9. The server 6 either hosts or is operatively connected on an internal network to an assessment software program 8 which is responsible for administering the interaction of the server 6 with an athlete assessment database 7, and otherwise coordinating the capture and creation of transactions and records in the athlete assessment database 7 and rendering reports or other dashboards and visual output information from the athlete assessment database 7 and its contents following the completion of a series of athlete assessment reviews.

Also shown in this Figure are a plurality of evaluator client devices 10. The system 5 would typically include a client device 10 for each individual evaluator who was participating in the evaluation of athletes in a particular assessment project. Two evaluator client devices 10 are shown but there could be a varying number of client devices 10 based upon the number of evaluators involved, anywhere from one through to a higher number.

It is contemplated that the server 6 would be a Web server, and the client devices 10 would contain a client web browser software which is capable of receiving information transmitted from the server 6 and displaying that to a user, as well as for providing via the interface and input and output capabilities of the client device 10 the ability for an evaluator using that device 10 to enter and transmit back to the server 6 captured values of subjective assessment attributes or objective assessment attributes with respect to an athlete, for storage in the athlete assessment database 7.

Also shown is a coaching client device 11 that could be used following the capture of subjective assessment attribute data 4 via one or more evaluator client devices 10 and storage of that information to the athlete assessment database 7, when the assessment window closes and it is desired to review the contents which were captured in the athlete assessment database 7 with respect to a particular athlete assessment project. Again if the server 6 was a Web server and the client devices 10 or 11 contained client web browser software, the coaching client device 11 could simply connect to the server 6 and have an output interface served to it. The server 6 could serve an evaluator interface and/or a drafting interface to client devices, in the case of an embodiment allowing for team drafting to users.

In operation of the athlete assessment system, the evaluators with their client devices 10 would be presented with an evaluator interface which was served to them from the server 6 by the connection of the client devices 10 to the computer network 9, which would allow for each evaluator to enter subjective assessment attribute 4 scores or indicators in respect of a plurality of athletes for assessment purposes. Following the entry of such information via the evaluator interface on the client devices 10, those subjective assessment attributes 4 in respect of individual athletes will be transmitted back to the server 6 for storage in the athlete assessment database 7 and eventual use in interface and reporting following the closure of the assessment window.

Service Bureau:

It is specifically contemplated that the athlete assessment method could be offered in a service bureau format, for the offering of athlete assessment IT assistance in accordance with the method of the present invention for use by multiple customers even in multiple sports at the same time. A service bureau offering this type of service is the method which is shown with respect to many of the embodiments demonstrated herein. It will also be understood that certain embodiments of the method of the present invention may rather than as a service bureau be rendered with only one or a small subset of the templates which would be used in a multi-sport service bureau embodiment, if a single server was going to be configured for use with a single sport and even by a single customer. Both such approaches are understood to be within the scope of the present invention.

Field Entry of Data Versus Centralized Input:

It is specifically contemplated that the actual capture of subjective assessment attribute information by evaluators in the field during the observation of athletes performing assessment exercises would be done remotely with wireless or remote client devices. It is also contemplated however that in particular in the case of objective assessment attributes, which only need to be entered once, that information could be loaded or pre-populated into the athlete assessment database 7 along with the remainder of the contents of the athlete records at the time that those were set up in the system, so that that information did not need to be entered in the field. Both such approaches again will be understood to be within the scope of the embodiments of the present invention which it is desired to protect herein.

Assessment Template Records:

Some embodiments of the athlete assessment system would contain a plurality of assessment template records each of which would correspond to a particular type of an athletic assessment routine which it was desired to apply to a plurality of athletes being assessed.

An assessment template record 30 would contain all the necessary information for the athlete assessment system to render the evaluator interface for data entry by evaluators for the assessment of athletes in a particular athlete assessment project. By designing the system the way that it deployed a series of assessment template records 30, multiple templates could be provided and the set-up of a particular athlete assessment project could involve the selection of a template for the right sport, the right category of athletes etc.—in this way, the same system, server and method of the present invention could be used by multiple evaluators in multiple athlete assessment projects to evaluate and assess athletes in multiple sports at multiple skill levels, all at the same time, simply by selecting an assessment template record which is linked or used to create the related project record for use in the evaluation and assessment of a particular group of athletes that correspond to the sport and skill level etc., that was desired.

The key aspect of the assessment template record 30 and related underlying template would be the inclusion therein of the necessary data and program instructions to allow for the capture of the specifically desirable assessment attributes in respect of a particular sport, particular group of athletes or a particular athlete assessment project. The embodiment of the athlete assessment database 7 which is shown in FIG. 5 shows one anticipated basic data structure which could be used for the development of the present invention in which the assessment template records 30 would in turn be connected to a plurality of attribute records—such that the individual attributes that it might be desirable to capture, either subjective or objective, could be configured in an attribute record and then attached to multiple project templates—for example a particular measurement or a particular subjective assessment attribute might be something that is used in many different sports and at many different skill levels and by setting up the attribute capture information properly that could be connected to multiple templates for use.

The information stored in the assessment template record 30 with respect to each subjective athletic performance and attribute might include the details for the proper rendering of that information and the evaluator interface to evaluate and capture a subjective score with respect to those attributes, as well as the scalar scoring mechanism to be used. If for example certain subjective assessment attributes are to be scored on scale of one to five, the details of the attribute to be scored as well as the details required in the system to dynamically render or adjust a field selection tool to present the ability to an evaluator to score that particular subjective assessment attribute on a one to five scale could be stored within the assessment template record 30 for use in the configuration or linking to a project record for a particular athlete assessment project. Various types of athletic assessment attributes could be stored within or in reltion to the assessment template records-certain of the objective or subjective assessment attributes could be used for one sport could also be useful for another while others would vary between sports.

In addition to allowing for variance of assessment template records by sports, skill level, etc., the assessment template records and underlying templates could also in certain cases be customized either by the user or for the user, or by or for a category of athletics—for example semi-professional or professional athletes might be graded on a larger number of attributes than a volunteer or community sports league would, and by using different templates this could easily be accommodated. It may even be the case that particular leagues or a particular user may wish to fully customize the templates that they use for their assessments in projects and this could also easily understood to those skilled in the art of database programming and are understood to be contemplated within the scope hereof.

Best Practice Assessment Approach:

One of the benefits of the system of the present invention is the fact that by building in a series of best practice oriented templates and assessment template records for the assessment of athletes in various sports at various skill levels, best practice and standardized assessment methodology could be used across larger portions of the industry, even where customers or sports personnel would otherwise not have the time, money or other resources to gain access to this methodology. It is specifically contemplated that many customers would specifically desire access to a centrally developed and centrally managed or maintained template set, as a means of always gaining access to up-to-date best practices in their assessment routines in athletic assessment projects. Alternatively, as is described herein and as is easily understood, those templates could all be customized on a user-by-user basis.

Server:

The method of the present invention will be implemented using a client/server IT architecture and would rely upon a plurality of client devices 10 in the field which were capable of interacting with a server 6 via a computer network 9. FIG.

7 is a schematic showing an illustrative embodiment of a server 6 in accordance with the present invention.

One or more servers 6 might be implemented in the method of the present invention-a single server or a server farm approach. The server or servers 6 will each comprise one or more processors 12 and memory 13. The memory 13 might contain various software components or processor instructions for use in the method of the present invention or otherwise in the operation of the server 6 including operating system and the like. Processor instructions corresponding to the athletic assessment software 8 are shown stored within the memory 13. The server 6 also in this Figure shows a network interface 14 by which the server 6 could connect with the computer network 9 and communicate with client devices 10 or 11. Various types of network interfaces can be understood to be used.

In addition to the general operating system instructions and other necessary software, the server 6 would comprise an assessment software program 8 which would be responsible for execution of the method of the present invention at the server end, and the assessment software program 8 may also act as the interface between the remainder of the software on the server 6 and the athlete assessment database 7, or the server 6 might alternatively include additional software to interface to the athlete assessment database 7 with which the athletic assessment software program 8 and its various subroutines could communicate.

The athlete assessment database 7 is shown in storage 15 within server 6 in this Figure. Many different types of hardware and software architectures can be contemplated and will be understood by those skilled in the art of client/server system design—the athlete assessment database 7 might be resident on the server 6 or might be hosted on another server operatively connected thereto.

The assessment software program 8 would comprise subroutines for administering the athlete assessment database 7, creating and modifying assessment attribute records and transactions in the athlete assessment database 7 in interaction with client devices of evaluators 10, as well as executing searches, conforming the data stored within the athlete assessment database 7 and executing any reporting or output interface instructions which were required against the athlete assessment database 7. The details of the operation of the assessment software program 8 mentioned and outlined in further detail elsewhere in this document.

Assessment Software Program:

Another key element is the assessment software program 8 resident on or accessible to the server 6—the functions of the assessment software program 8 would include creation and administration of records in the athlete assessment database 7, interaction with the client devices 10 or 11 via client software thereon, for the purpose of display of information from the athlete assessment database 7 to users in the field as well as for the receipt of assessment attribute data or other information uploaded from client devices 10 or 11 and their users to the athlete assessment database 7. It is also contemplated that there would be a query and reporting interface either within the assessment software program 8, or accessible to the athlete assessment database 7. Each of these software modules could be freestanding software applications or subroutines within the memory or storage of the server, or alternatively they could each be functions in a consolidated software program and both such approaches will be understood to be within the scope of this application.

Figure 8:
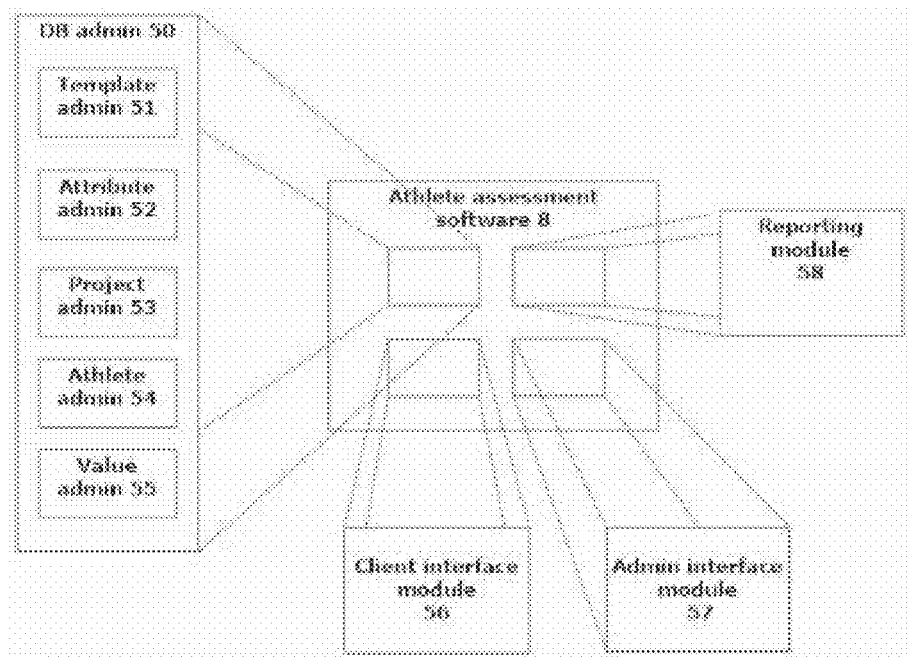
FIG. 8 is a schematic diagram of one embodiment of the assessment software program of the present invention, demonstrating the various software subroutines which would be used to create, administer and output athletic attribute information in accordance with the system and method herein.

FIG. 8 shows the key components or subroutines which would be contained within the assessment software program 8. Overall the creation and administration of records within the athlete assessment database 7 would be conducted by a database administration module 50. The database administration module 50 through at least five subroutines or substructures, would be responsible for the administration of records in the various subsets 25, 26, 27, 28 and 29 within the athlete assessment database 7. The database administration software module 50 could, in addition to the possibility of being a purpose built software application, also comprise a layer of software instructions created for use in association with a preexisting database tool.

A template record administration module 51 would be responsible for the creation or administration of assessment template records 30 within the project template subset 25. This module might also work in conjunction with other software modules for the purpose of querying or reporting from the athlete assessment database 7, or for the sake of structuring user interface and interaction with the athlete assessment database 7 and the remainder of the software of the athlete assessment system. Many different types of database administration approaches will be understood to those skilled in the art of database programming and all such approaches are contemplated within the scope hereof.

Similar to the template record administration module 51 it is also contemplated that there would be a attribute detail record administration module 52 in an embodiment as shown in FIG. 8, responsible for the creation or administration of attribute detail records 34. There would also be a project record administration module 53 responsible for the creation or administration of project records 38 within the athlete assessment database 7.

There would also be an athlete record administration module 54 responsible for the creation or administration of athlete records 41 within the athlete assessment database 7, and there would also be potentially an assessment attribute record administration module 55 responsible for the creating and administration of assessment attribute records 45 within the athlete assessment database 7, in accordance with the database structure outlined.

Either within the software modules or elsewhere in computer storage accessible to the processor and memory of the server 6 are interactive web forms or other client software instructions or information which might be required for a field user with a client device 10 or 11 to interact with the athlete assessment software 8 for the purpose of updating, creating or otherwise manipulating data in the database 7 via an evaluator interface.

In addition to the overall database administration module 50, the processor instructions accessible to the server 6 in the assessment software program 8 would include a client interface module 56. The client interface module 56 might comprise necessary processor instructions for the server 6 to interact with one or more client devices 10 via a computer network 9. The client interface module 56 might effectively and primarily comprise a server to send and receive data to and from the athlete assessment database 7 to the software resident on those client devices 10 or 11—the client interface module 56 would be primarily responsible for serving and interacting with evaluators via the evaluator interface, or at least one team administrator via the drafting interface. In addition to processor instructions, the client interface module 56 might also include web forms, media or other data which was required to engage and sustain a communication session with a client device 10 or 11.

Also shown is an administration interface module 57. There would potentially be the need for at least one administration interface either for the purpose of querying data from the athlete assessment database 7, administering the athlete assessment database 7 or otherwise interacting either with the athlete assessment database 7 or with the client devices 10 or 11 during the delivery of the remainder of the method of the present invention. The administration interface module 57 might comprise a freestanding software client or client component which could be used to interact with a user via a user interface of a client device 10 or 11 or another computing device connected to the server 6. The administration interface module 57 might also be accessed directly through the user interface of the server 6 itself. Alternatively, the administration user interface module 57 might again comprise the necessary software instructions and data to accommodate the delivery of an administration interface by a traditional client server browser interface and both such approaches again are contemplated within the scope of the present invention.

Also shown is a reporting module 58. It is explicitly contemplated that the primary benefit of the athlete assessment method herein would be the rapid and reasonably streamlined capture of athlete assessment attributes and values from evaluators using client devices 10, and also by virtue of the fact that the assessment attribute values are stored and captured in an athlete assessment database 7 allow for a very rapid ability to either run a program or on an ad hoc basis conduct queries against the entire data set related to a particular athlete assessment project for the purpose of identifying athletes or particular attributes. The reporting module 58 might be custom programmed or might also comprise a reporting system which can be purchased and/or connected or programmed in relation to the athlete assessment database 7. The reporting module 58 would also potentially have the functionality built therein to conduct any normalization of data captured to the athlete assessment database 7 or any other adjustment or ranking or calculations before particular interfaces, dashboards or reports were driven or generated thereof.

One of the key benefits of the athlete assessment method is that since both assessment template records as well as attribute detail records 30, 34 were stored in the athlete assessment database 7 in some embodiments, adjustment of those templates and template details would allow for simple customization or adjustment of the workflows to be used by evaluators in conducting athletic assessment in accordance with the method of the present invention, either for custom client purposes or by adjustment for the overall best practices templates for use by multiple customers of the system and method of the present invention.

While we speak of the various components of the athlete assessment software 8 as freestanding or identifiable modules, it will also be understood that the various functions could be carried out by identified functions within a single consolidated application and both such approaches as well as any other design modifications which will be obvious to those skilled in the art of client/server programming, and other software development and database development and integration techniques, which do not depart from the overall concept of a software component on the server 6 for the purpose of administering the method and the storage of information to and from the database 7 are all contemplated within the scope hereof.

Figure 9:
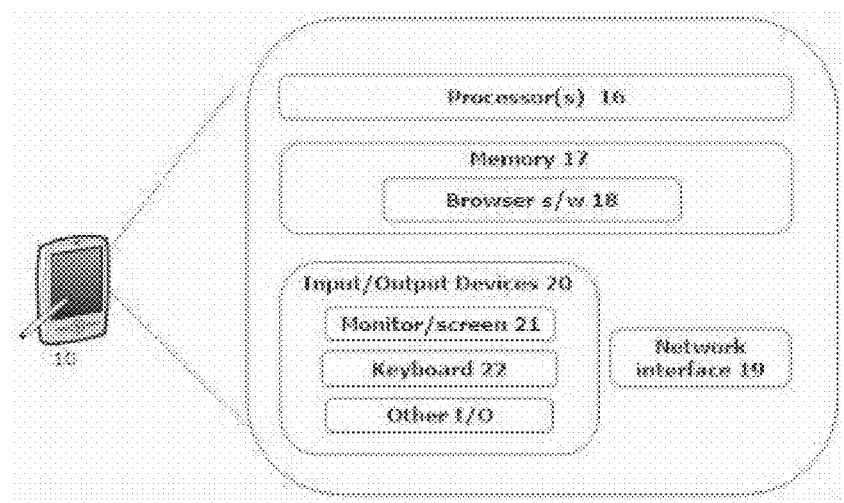
FIG. 9 is a block diagram of the components in one embodiment of a client device of the present invention.

Client Devices:

FIG. 9 is a schematic representation of one client device 10 in accordance with the present invention. The client device 10 includes one or more processors 16 and memory 17 within which multiple or various computer processor instructions might be resident or stored for the purpose of overall operation of that client device 10. It is specifically contemplated in a circumstance where the server 6 is a web server which will dynamically serve and receive content to and from a browser software 18 installed upon one or more client devices 10 that the primary software interface installed on the client device 10 for use in association with the server 6 and the remainder of the present invention is a regular web browser software 18.

Also shown is a network interface 19 which would be in the case of this particular device shown a wireless internet or telecommunications interface. Also shown are a plurality of input/output devices 20 including a monitor/screen 21, and optionally a keyboard 22 or the like.

Certain embodiments of the method and system of the present invention might be developed for use of a proprietary or a closed client software 18 resident on the client device 10, where interactions with the server 6 were undertaken through a purpose built software interface. A purpose built application for installation into the memory of the client device 10 which would use the components and the network interface 19 of the client device 10 to connect and communicate with the server 6 and the remainder of the athlete assessment system for the purpose of sending and receiving information to and from the athlete assessment database 7 from the field. Either approach to the overall network architecture contemplated for the present invention as well as the software to be used on the client device 10 is contemplated within the scope hereof.

Many different types of client devices 10 can be used in association with the present invention. As outlined, the key concept with respect to the types of client devices 10 which can be used in the method of the present invention is that wireless devices could be used to allow for the best streamlined field entry of athletic assessment attributes captured by evaluators observing athletes, for communication and storage in the athlete assessment database 7 through the remainder of the athlete assessment system. Most desirably, the client devices 10 would be non-purpose built hardware, using pre-existing communication networks-such as tablets, smartphones or portable computers connected to wireless data networks. Use of non-specific hardware in this fashion would allow for the installation of additional software components for the practice of the method of the present invention on pre-existing hardware and non-purpose built hardware. Any type of a computing device which was capable of interaction with the remainder of the system of the present invention on the server 6, and the remainder of its associated components via the network 9 are contemplated within the score hereof.

There may be more than one type or category of client device 10 which is used in the overall practice of the method of the present invention. As has been discussed, there would be at least one client device 10 which would be used by at least one evaluator in the field to potentially enter assessment attribute information for storage to the athlete assessment database 7. There might also however be a separate client device 11, as is shown in certain of the Figures herewith which would be either the same or a different type of a device which could be used by a coach or other category of management personnel with respect to an athlete assessment project to actually view the ranked results of athletic assessment. Most likely the client devices 10 and 11 would all comprise tablets or some similar type of device and would all be the same—and insofar as the delivery mechanism to the client devices 10 or 11 was a web browser it could be somewhat device agnostic, but it will be understood that different categories or types of devices could be used by each individual interacting with the system or the present invention and again all such approaches are contemplated within the scope of the present invention.

Client Device Software:

Insofar as the athlete assessment method of the present invention is built around the ability of evaluators to remotely enter and store at least subjective assessment attribute information into an athlete assessment database 7, the client devices 10 used by evaluators would need to include a software program which is capable of interacting with the remainder of the athlete assessment system. It is contemplated that this could take one of two approaches-either a free-standing and proprietary client software 18, capable of communicating via the network 9 with a server 6 and the athlete assessment database 7 resident thereon along with the assessment software program 8 on the server, or alternatively some other embodiments of the invention might use a client server approach, whereby the server 6 would be a web server with the necessary authentication components to provide for secure or authenticated communication between evaluators and the assessment database 7 using conventional client server or server and browser communications and data interface techniques. Either such approach is contemplated within the scope of the present invention—the basic requirements of the client software 18 would be the need to be able to interact with the remainder of the software and hardware components resident on or connected to the client device 10 at the appropriate time to read or capture data entry from an evaluator using that device, as well as to provide for the ability to interact by way of data entry forms with the server 6 for the provision of assessment attribute data for upload for saving to the athlete assessment database 7 in respect of a particular athlete and athlete record. In certain cases the client software used by or accessible to the client device 10 would also provide the ability to retrieve attribute or other information from the athlete assessment database 7 accessible to the server 6, by inquiring and transmitting query information for use in the extraction of such information.

Where some embodiments of the client software and the remainder of the athlete assessment system provide the ability to do impromptu query reporting from a client device 10, other iterations of the software 18 in conjunction or coordination with the server 6 and the assessment software program 8 thereon would provide access to certain canned queries or reports which might be desirable for use in the ranking of assessment of athletes. Those reports could either be called to the client device 10 or 11 in a static fashion, or there could be a pre-programmed query and reporting format available within the server which could pull dynamic or live data from the athlete assessment database 7 for display in a pre-determined format based upon the most up-to-date contents of the athlete assessment database 7 including all of the records therein corresponding to a particular athlete assessment project.

Evaluator Interface:

Various types of user interfaces could be provided for evaluators to use in the entry of assessment attributes and other information including athlete identifiers and attribute values. for storage to the athlete assessment database 7 and for subsequent use in the remainder of the method. The primary basis for interaction with a database system such as this is the provision of one or more forms on the front end through which a user can interact with the database, query up information and/or send information for storage in the database—software components, queries or other layers of processor instructions are placed either at the client or server end between the interface and the database to facilitate the interaction with the user.

If the method of the present invention and the architecture of the system is deployed as a client server secure web site system then the user interface, and particularly the evaluator interface, would be created by one or more forms and windows which could provide for interaction between the server and the client devices-alternatively in a case where free-standing client software was installed on the client device 10 or 11, the client software could include the necessary instructions and other items required to interact with a user and allow data entry, storage and capture, etc.

Figure 10:
FIG. 10 is a sample user input function selection screen display for a client device in one embodiment of the present invention.
Figure 11:
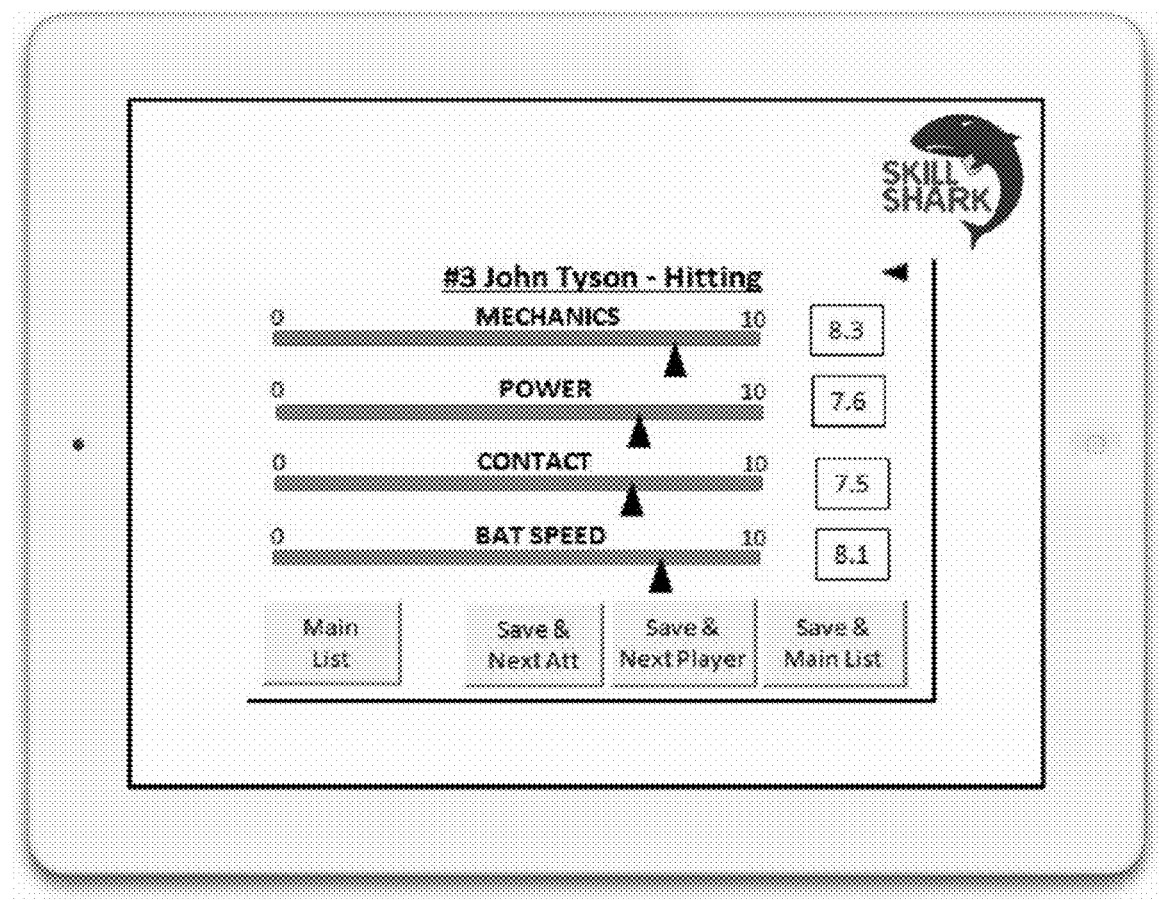
FIG. 11 is a sample user data entry screen display in one evaluator interface in accordance with the invention, whereby an evaluator could enter assessment attribute values for storage to the athlete assessment database.

FIG. 10 and FIG. 11 show samples of data entry screens which could be used as an evaluator interface by evaluators seeking to capture assessment attribute values for storage to the athlete assessment database 7. FIG. 10 is a sample of a screenshot showing a user interface. There is shown a client device 10 on which the screen display shows an interactive client server web page with indications for the use of an evaluator to allow them to access different attribute entry screens. This is one sample of an evaluator interface or function thereof.

FIG. 11 shows a screen shot on a tablet computer in relation to the initial menu shown in the embodiment of FIG. 10, in which assessment attribute entry can be made and viewed in respect of an athlete. These would be client server web pages connected from a client device 10 of an evaluator back to the server 6 and assessment software program 8 and athlete assessment database 7 for the purpose of entry and processing of various assessment attribute information.

Figure 12:
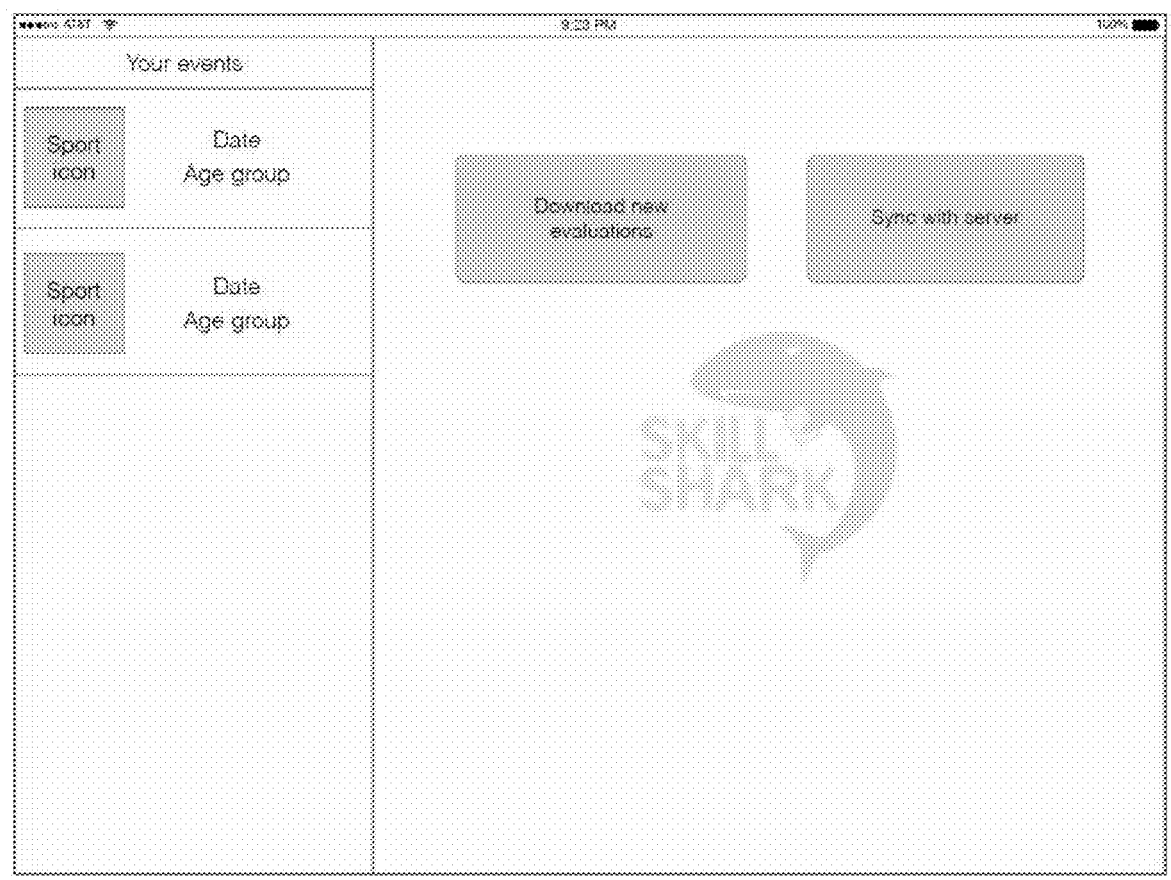
FIG. 12 is a sample screenshot of an alternate embodiment of an evaluator interface in accordance with the present invention.

FIG. 12 through FIG. 16 show alternate embodiments of data entry screens within variations of the evaluator interface, which are shown to demonstrate how the evaluator could be allowed to select and enter information in respect to particular athletes to an athlete assessment database 7. These screens could be screens of a proprietary software or could again be client server web page screens and both such approaches are contemplated. Referring for example to FIG. 12 there is shown an entry screen through which an evaluator could select access to one or more athlete assessment projects and their related project records 38. Presumably by selecting one of the athlete assessment projects-indicated by date and age group, the client device 10 would then synchronize with the server 6 and the assessment software program 8 thereon for the purpose of allowing access to the athlete records 41 related to the project in question.

Figure 13:
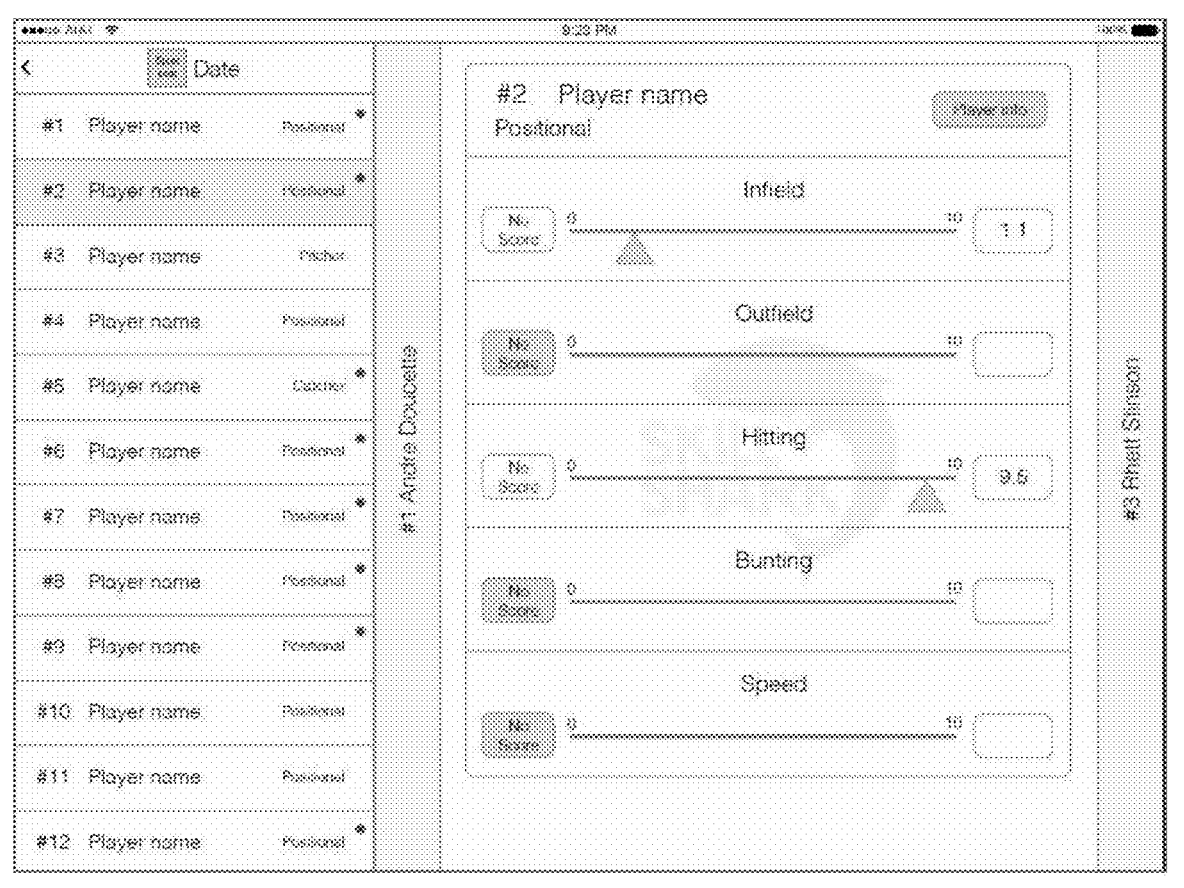
Figure 14:
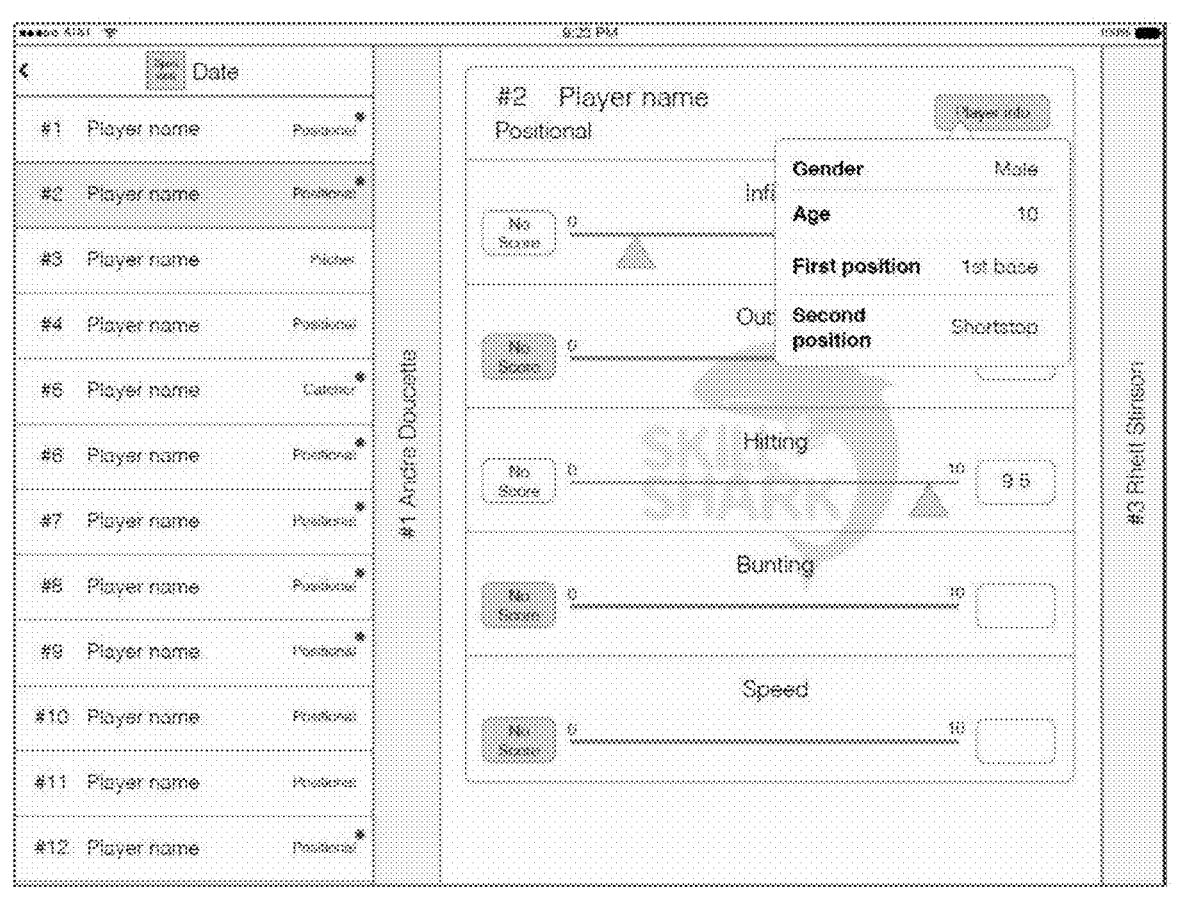
Figure 15:
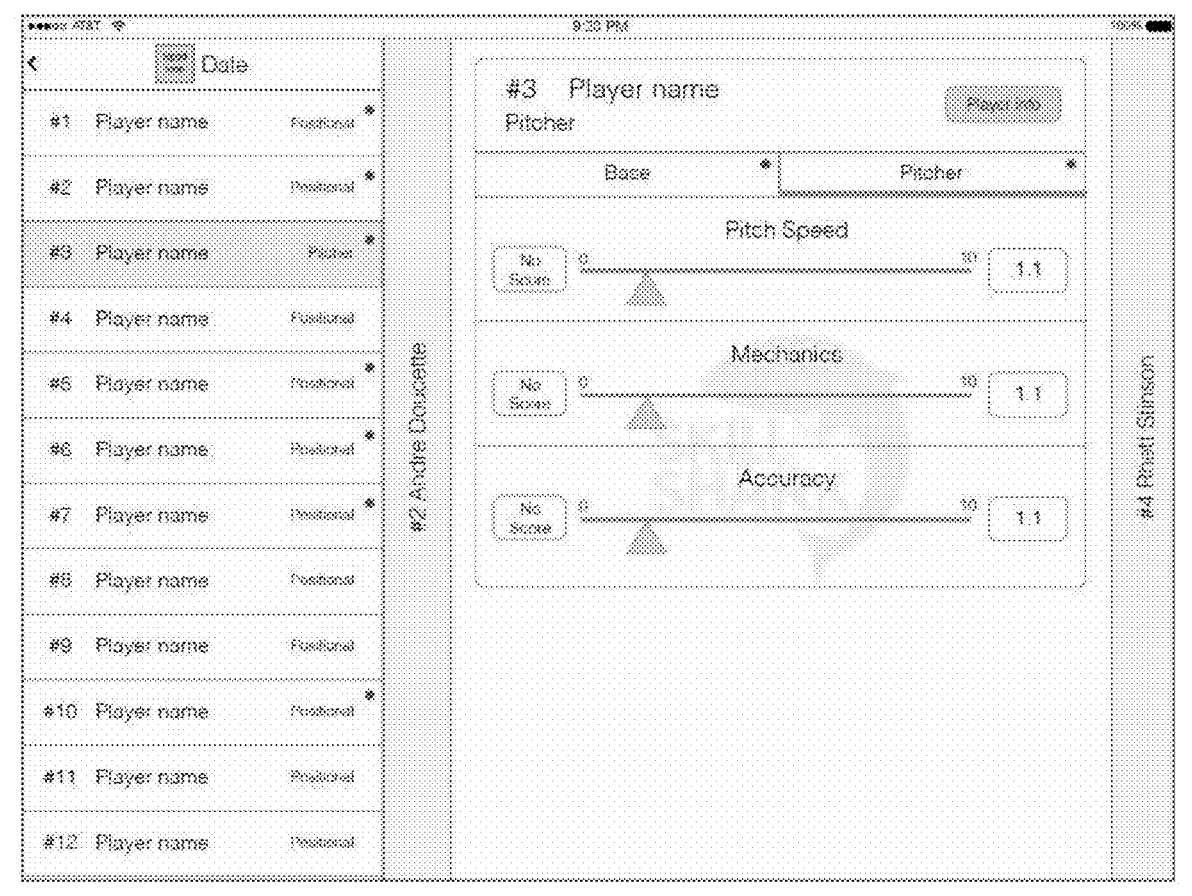
Figure 16:
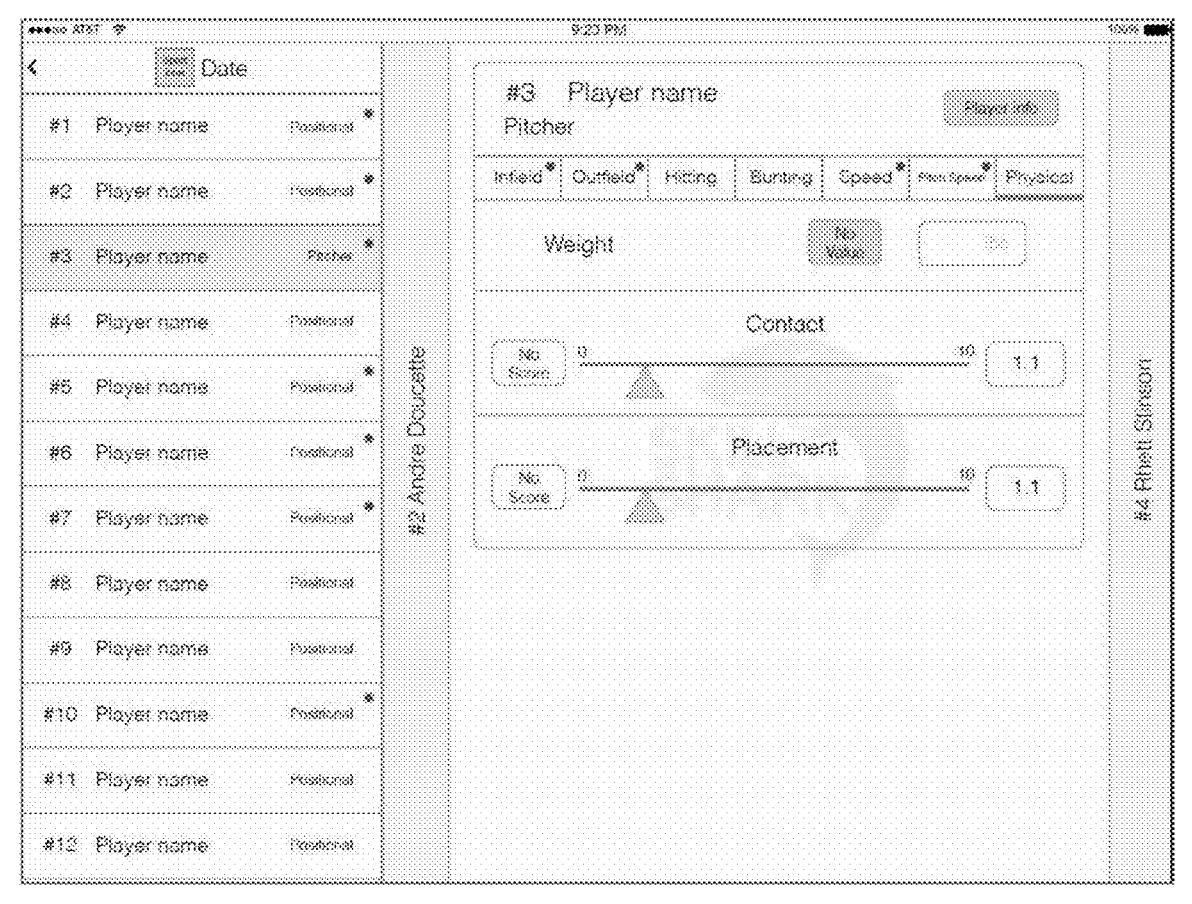

Referring to the next data entry screen, shown in FIG. 13, there is shown a data entry screen for particular assessment attributes of an athlete, in baseball. The assessment attributes shown on this particular data entry screen are all subjective assessment attributes which it can be seen are entered by entry of a number in a data field or by a slider on a visual scale. Any number of different types of user interface approaches could be taken in this regard. Shown next in FIG. 14 is a dropdown player information screen, in which certain athlete details or athletic assessment attributes, including gender and age, as well as team positions, are shown. The data entry screens in FIG. 15 and FIG. 16 show additional data entry options for the capture of various attribute values to the athlete assessment database for use in the assessment of athletes.

Output and Reporting Interface:

Similar to the evaluator interface which will be provided on a client device 10 by which evaluators could enter assessment attribute values for storage to the athlete assessment database 7, it will also be understood that various types of output or display interfaces are contemplated. In some embodiments it may be desired to extract athlete assessment information and attribute values from the athlete assessment database 7, and through the athlete assessment system render one or more paper reports for use by teams in the selection of athletes or team rosters.

Alternatively, rather than a paper or static report, it will also be understood that an alternate embodiment of an output interface would be to provide a dynamic dashboard wherein on a client device 10 or 11, teams could dynamically interact with the captured information with respect to athletes in a particular athlete assessment project which were stored in the athlete assessment database 7 and use the information in that type of an interactive or dynamic way.

Figure 17:
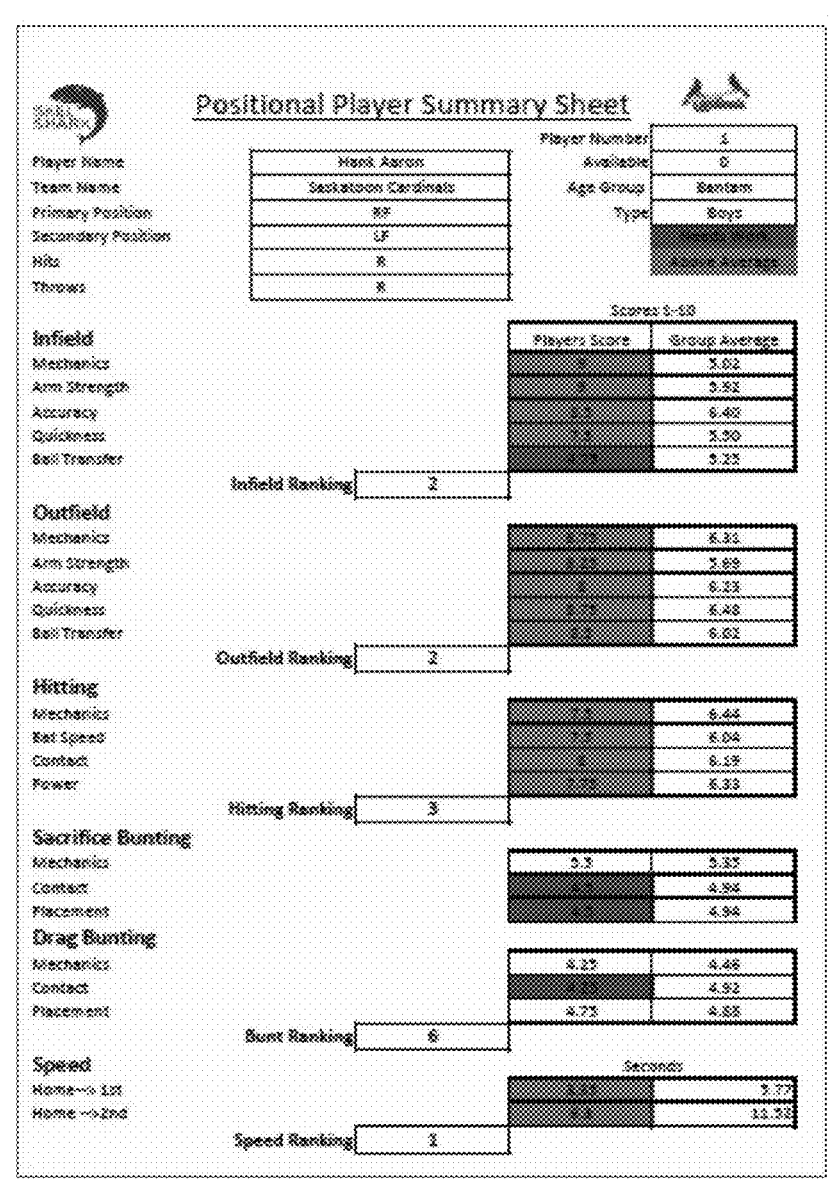

FIG. 17 shows one example of an output being either a visual report on the screen of a device or a printed report, and more specifically is a summary sheet related to the captured subjective assessment attributes and objective assessment attributes in respect of a particular athlete. In this case, this report shows the scores of that player and compares them visually against group averages in the athlete assessment project, as well as demonstrating a ranking for each player in each heading of assessment attributes. Any number of different types of displays or reports, as well as any number of different types of scoring or normalization methodologies for application for the captured performance attribute values are contemplated within the scope here.

Figure 18:
FIG. 18 is a sample of data output from the athlete assessment system, showing ranked data based on the captured assessment attributes of a plurality of athletes.

Referring to FIG. 18 there is shown an alternative display of information from a particular athlete assessment project—a series of athletes are ranked and all of their relevant information in respect of a particular metric or a particular position are displayed in this particular screenshot or printed report. Any type of a report with any type of ranking or scoring based on the assessment attribute information captured in the athlete assessment database is contemplated within the scope of the present invention. It will be understood that really there are infinite options and possibilities in terms of the output and reporting interface and the output which is displayed to users either on paper or in a visual screen format. The samples shown in FIG. 17 and FIG. 18 are only representative of some options and any number of different approaches could be undertaken and all are contemplated within the scope of the present invention.

Populating the Athlete Assessment Database:

In some cases the setup or configuration of a particular athlete assessment project would involve pre-population of the athlete assessment database 7 with the necessary basic project records and athlete records corresponding to a particular type or template of assessment project, based on which the field entry of assessment data could be streamlined. Pre-population of the database could take place in the field or centrally at the back office. The population of the athlete assessment database for the purpose of the conduct of an athlete assessment project could be done using a software interface by which one or more users could individually or simultaneously enter all the necessary information in respect of the project and the athletes in question.

Figure 19:
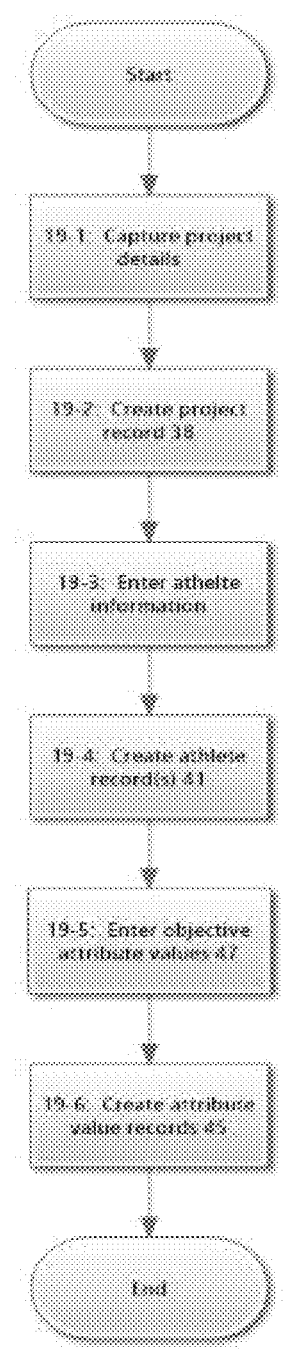
FIG. 19 is a flowchart demonstrating the steps in one embodiment of the prepopulation of the athlete assessment database with at least one project record, athlete records and in this case objective assessment attributes in advance of the at least one evaluator capturing assessment attribute data for assessment attribute records in the athlete assessment database.

Referring to FIG. 19 there is shown a flowchart demonstrating the steps of one embodiment of a business method or approach to populate the athlete assessment database 7 with the necessary records for the conduct of an athlete assessment project in accordance with the remainder of the athlete assessment method. For the purpose of this flowchart, it will be assumed that there are a plurality of project templates defined in a series of assessment template records 30 in an athlete assessment database 7 in accordance with that shown in FIG. 5. As well as a plurality of assessment template records 30, there could also be a plurality of attribute detail records 34, each of which was connected to one or more assessment template records 30. The connection between these various tables in an athlete assessment database 7 would be understood by those skilled in the art of relational database design.

In order to populate the athlete assessment database 7 for the conduct of a new athlete assessment project, a project record 38 would be created. The first thing that would be done in order to create a project record 38 would be to capture a connection of the athlete assessment project in question to a particular assessment template record 30—capture of a template ID 31, linking to a particular assessment template record 30, in addition to other information 40 including evaluator information, security information or other items which might be defined in the template or elsewhere in the system would be understood to comprise this first data entry step. This is shown at step 19-1.

Next at step 19-2 the project record 38 corresponding to the particular athlete assessment project being created would be created in the athlete assessment database 7. Likely a project ID 39 would be assigned to that record or some other type of database key would be created in which links could then be created from the project record 38 to other related entities in the athlete assessment database 7.

Following the creation of a project record 38, or at a different time altogether, at least one athlete record 41 could then be created and connected to the project record 38. To create an athlete record 41, which would have an athlete identifier 42 assigned thereto, a user would be allowed via a user interface of a client device 10 to enter various athlete identifying information 43 including name, age, gender etc. as well as any other information 44 which might be relevant for the purpose of the practice of the remainder of the method, and this athlete identifying information 43 and other information 44 would be stored within the athlete record 41 which was created. Entry of the athlete identifying information 43 and other information is shown at Step 19-3—this would be done via the user interface of at least one client device operatively connected to the server. Following entry of that information, the assessment software program 8 would through its various processor instructions actually create the at least one athlete record 41, shown at step 19-4 in this Figure.

Shown next in this diagram at stage 19-5 is the optional entry of objective assessment attribute values 47. It may be the case that those assessment attribute values that are objective and which can be entered once by a single user might be done centrally or in the back office rather than by evaluators in the field and so in this particular embodiment of the method of population of the athlete assessment database 7 in anticipation of the conduct of an athlete assessment project, the entry of objective assessment attribute values 47 is shown. The record structure which is shown in the performance attribute subset 29 in FIG. 5, which is just one embodiment of the athlete assessment database 7, will again be understood to those skilled in the art of relational database design—each attribute value record 45 is shown to have a link to a particular project record 38 via a project ID 39, as well as to a particular attribute template or detail record 34 via an attribute ID 35. Those attribute values are also connected to a particular athlete record 42 by the identifier therefore. The actual attribute value 47 is also shown.

It will be understood that many different approaches could be taken to the capture or prepopulation of this information and all such approaches are contemplated herein. As well, the database 7 may not be prepopulated for the conduct of an athlete assessment project and the athlete assessment project records 38 and either related fields, values and connectors in the database might all be created via the evaluator interface of one or more evaluator client devices 10 during the completion of the remainder of the method for the capture of subjective assessment attribute values. Both such approaches are contemplated within the scope hereof.

Subjective Attribute Capture:

In the conduct of a particular athlete assessment project, the key function which will be undertaken is the capture of subjective assessment attribute information to the athlete assessment database 7. As has been outlined in detail elsewhere herein, subjective athletic assessment by one or more evaluators, captured to the athlete assessment database 7 from remote client devices 10, allowing for the removal of necessary central processing steps post evaluation and assessment before the athletes can be considered or ranked for team selection purposes is the key aspect of the present invention. As outlined above, the athlete assessment database 7 might be pre-populated with the necessary information related to the particular assessment project by the creation of a project record 38 and/or plurality of athlete records 41 related to the particular project in question, considering the embodiments of the system and database outlined herein. The key attribute information which will be captured in the field by evaluators, except in cases where they might also enter some pre-population information, is the capture of subjective assessment attribute values. Objective assessment attribute values might also be captured in the field using the same approach by one or more evaluators.

Figure 20:
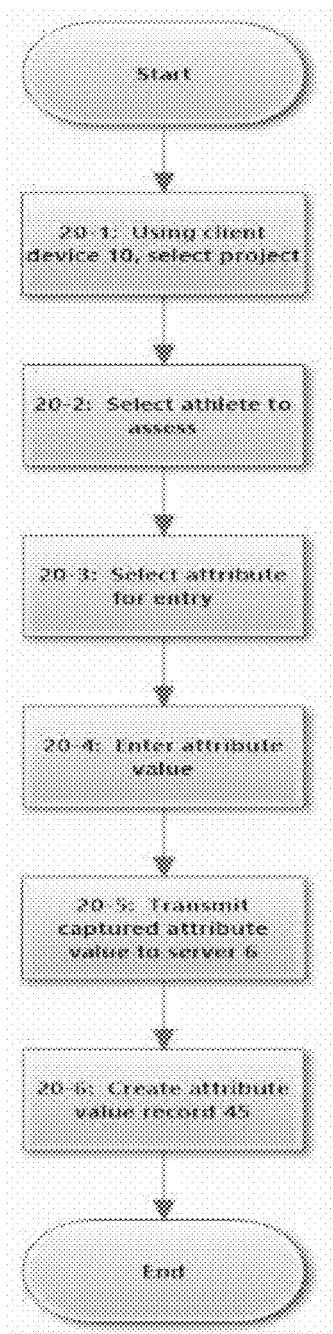
FIG. 20 is a flowchart demonstrating the steps in one embodiment of the detailed method of capture of assessment attribute information to an athlete assessment database in accordance with the athlete assessment method.

FIG. 20 is a flowchart showing one embodiment of a business method outlining the capture of assessment attribute values for storage to the athlete assessment database 7. Using a client device 10, an evaluator would access the system and the server 6 and the assessment software program 8 thereon, and select an athlete assessment project in respect of which they wish to enter assessment attribute information. In certain cases where only one project was available to certain evaluators, this authentication might take place automatically based upon login to the client device 10, or in other cases it might be that multiple projects even in multiple sports would be ongoing at the same time by individual evaluators and they could be presented with some type of a menu or interface by which they could select the particular project in respect of which they wanted to enter information. This is shown at step 20-1.

The project record 38 related to a particular project would likely be associated with a project template and attribute information and details in respect of which project would need to be captured. The selection of a project for data entry, shown at 20-1, might then present to the evaluator a list of athletes related to athlete records 41 which are connected to the related project record 38. The evaluator would select an athlete to enter assessment attributes in respect of, shown at 20-2. The selection of an athlete could either be shown on a second data selection or menu following the selection of the project, or could alternatively be provided in conjunction with the following step where the actual attributes to be entered would be selected or made. Upon selection of an athlete to assess at 20-2, the evaluator would commence viewing the athlete in their assessment exercises and/or would eventually have subjective assessment attributes for entry to the system for storage to the database 7. Shown at 20-3, the evaluator would select via the user interface of the client device 10 a particular assessment attribute for entry, and then, shown at step 20-4, enter an attribute value in respect of that performance by the athlete. If it was an objective assessment attribute, the value could simply be entered, in other cases where there were subjective assessment attribute being entered which were comparative and scaled in nature, the evaluator could enter a comparative scale value or the like in respect of the athlete. Virtually any type of a scale or data entry approach could be contemplated here limited only by the flexibility of the backend data handling software and technology.

Following the entry of an attribute value at 20-4, the client software on the client device 10 would transmit that captured attribute value to the server 6 for storage to the athlete assessment database 7. Transmission of that attribute value is shown at step 20-5—the transmission might either take place by way of a validated form entry through a client server webpage or the like, or if the client software on the client device 10 was a standalone or offline software it could also be the case that periodic transmission would take place back to the server 6 to communicate the captured attribute values thereto.

On receipt of captured attribute values from one or more client devices 10, the server 6 via the assessment software program 8 would create in the athlete assessment database 7 one or more assessment attribute records 45, capturing and correlating the attribute values captured by the evaluator at the client device with the project. Many different types of data structures or storage techniques are understood and contemplated in this regard and all such approaches are contemplated herein—the creation of the assessment attribute records 45 is shown at step 20-6.

In certain cases, a project template record 30 or other related software on the system might include instructions for the conformity or transformation of captured attribute values before the assessment attribute records 45 were created.

It will be understood that this Figure and flowchart really only shows one possible very basic approach to the business method of capturing subjective or objective assessment attribute values and data for storage to the athlete assessment database 7 in accordance with the remainder of the present invention. Any type of an approach which did not depart from the underlying business method is contemplated within the scope hereof.

Data Display:

The final general component of the software and method of the present invention is a method by which captured athletic assessment attributes from the athlete assessment database 7 can be displayed to one or more users, without the need for significant backend manual data transposition processes and the like. Once the evaluator interface and client devices 10 are used to capture assessment attribute information in an athlete assessment project, by the creation of assessment attribute records 45 in the athlete assessment database 7, which are connected to athlete records 41 and/or a project record 38, the provision of a reporting or query interface on the front end of this athlete assessment database 7 to provide a dashboard or reporting of results contained therein, either during the execution of the project or following the completion of subjective athletic assessment, will be understood to form a key component of the present invention and to be understood to those skilled in the art of database and data handling structures.

Figure 21:
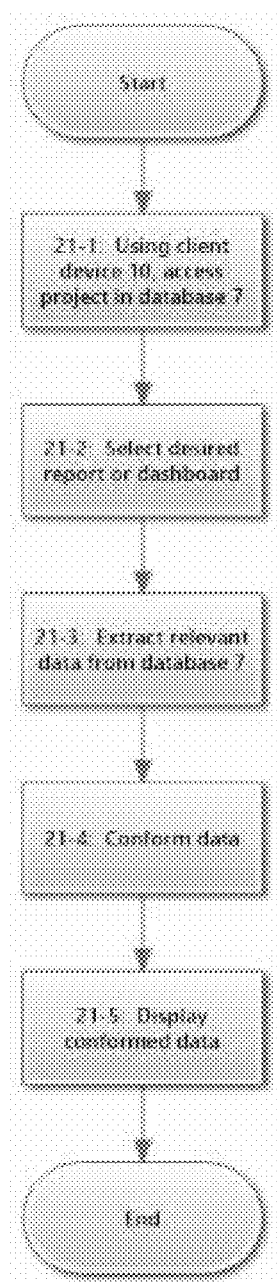
FIG. 21 is a flowchart demonstrating the steps of one embodiment of the end user display component of the athlete assessment method.

Referring to FIG. 21 there is a flow chart shown which includes the steps of one method demonstrating the extraction and reporting of data from the athlete assessment database 7 that has otherwise been captured in accordance with the method of the present invention. Typically, either during the conduct of an athlete assessment project or at its conclusion when it is desired to view the subjective assessment results in relation to one or more athletes for the purpose of ranking and selection of athletes or teams, it will be desirable to use at least one report or dashboard which would present the desirable information for use by coaches or other users who would want to view this information. Using a client device, a user would log into or access a particular athlete assessment project in the database 7 likely by authenticating themselves from their device in relation to a particular project record 38 in the athlete assessment database 7 and related data attached thereto. This would be done via user interface on the client device 10 or otherwise. This is show at step 21-1.

Following accessing the project record 38 through a login on the user interface of a client device, the user would potentially be allowed to select a desired report or dashboard format for the results that they wanted to view—for example the athlete assessment system may provide only a single type of a report in respective of a particular assessment template record 30, or more likely there would be multiple types of reports or dashboards built into the system, all of which will be accessible to the user—these dashboards could be configured to display selected attribute details and the like based on the remainder of the configuration of the system and could display information related to a single athlete or to an entire group of athletes assessed in a project. Selection of the desired report or dashboard is shown at step 21-2—again it will be understood that this could be done in many different ways dependent upon the user interface of the remainder of the athlete assessment system.

Dependent upon the types of objective or subjective assessment attributes which were required to use to construct the selected report or dashboard, selected in step 21-2, the reporting module of the assessment software program 8 would extract the relevant data from the athlete assessment database 7. Execution of that extraction step is shown at step 21-3 in this flowchart. Data selection and query tools for the purposes of generating database driven reporting and visual dashboards again are understood to those skilled in the art of database design and user interface design and as such all such approaches which might be obvious to accomplish the goal which is to extract the necessary captured objective and subjective assessment attribute information as well as other information pertaining to athletes or projects from the database 7, as otherwise captured or maintained in accordance with the remainder of the method outlined herein, will be understood to be within the scope hereof.

Following the data extraction step at 21-3, in some cases it may be desired to conform the data, by normalizing, averaging or otherwise applying certain masks or calculations to the raw athlete based attribute data contained within the athlete assessment database 7 for the purpose of the selected attribute dashboard or reporting. Conforming the data is shown at step 21-4—it will be understood that certain reports or dashboards might require different data conformation activities to be undertaken or applied and those are again all contemplated within the scope hereof. As well, certain reports or dashboards may display or contain raw data which is not conformed in which case this step would not be required.

Following the conforming of the data, shown at step 21-4, the selected desired report or dashboard would be displayed to the user via their client device—this is shown at step 21-5. It will also be understood that a dynamic or interactive reporting format could be developed or provided where the user could actually sort, rank or otherwise act upon the contents of that display and interact with the system in that fashion as well.

Normalizing Data:

One of the things that could be done by the assessment software program 8 and the remainder of the software resident on the server 6, in driving an output or reporting interface to display to a user properly manipulated or processed results captured in an assessment project in accordance with the remainder of the present invention is the fact that the server and the software could easily be programmed to apply normalization techniques to data which was captured in circumstances where for example multiple evaluators evaluated athletes in respect of certain subjective assessment attribute. In some types of manual scoring systems the results are normalized by for example eliminating the top and the bottom score and averaging the others—there would be many different types of statistical or mathematical approaches which could be taken and it would be understood that one of the benefits of the system with the present invention is the fact that various types of data transformation or normalization operations can be conducted on the data or on the results as they are manipulated for display in an output interface. All such approaches are gained or contemplated within the larger scope of the present invention.

Drafting Interface:

Beyond the basic interface by which dashboards or reporting can be automatically or rapidly generated off of the captured athletic assessment attributes stored within the database, it will be understood that there are added functions which can also be implemented as add-ons or extended functions. For example, it will be understood that a drafting interface could be created, based upon which multiple coaches or multiple teams could participate in a draft to build teams in a sports league, based upon underlying athletic performance assessment information gathered in accordance with the remainder of the present invention. Allocation of athletes within a particular dataset into individual teams in the league will be understood to those skilled in the art of user interface and database programming and it is understood that the addition of a drafting interface to a database containing the types of athletic performance assessment and attribute information outlined elsewhere herein is explicitly contemplated within the content and scope of the present invention.

In addition, it will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept. Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An athlete assessment system, comprising:
   one or more processors;
   a server, the server comprising the one or more processors;
   a network interface, the network interface is operatively connected to the server;
   one or more memories;
   athletic assessment software having one or more subroutines;
   one or more computer-readable hardware storage devices, the one or more computer readable hardware storage devices contain program code executable by the one or more processors via the one or more memories to implement instructions corresponding to the athletic assessment software;
   a database administration module;
   an athletic assessment database of records, administered by the one or more subroutines of the database administration module of the athletic assessment software, in communication with the server and comprising:
   an assessment template record, created and administered by a template record administration module, to report from the athletic assessment database, the assessment template record to retain project parameter data, the assessment template record to correspond to an athlete assessment project that enables a selection of an athletic team and members thereof from an available talent pool or enables enhanced assessment of the athletic team and members thereof;
   a plurality of attribute records, each being linked in the athlete assessment database to a specific athlete record for a specific athlete, each containing a captured assessment attribute of the specific athlete to which it relates, wherein captured assessment attributes comprise objective assessment attributes and subjective assessment attributes, wherein each objective assessment attribute is a quantifiable measurement of performance of the athlete or of a physical attribute of the athlete relevant to participation on the athletic team, wherein each subjective assessment attribute is subjectively determined by at least one human evaluator with experience in a sport for which the athletic team competes, wherein for the athletic assessment project each athlete of the athletic team associated with the project has the related assessment attributes for that athlete scored based on normalizing the attributes specific to that athlete across all related attribute records of the athletic assessment database;
   a plurality of athlete records, each created and administered by an athlete record administration module, the athlete records each having an athlete identifier that corresponds to athlete identifying information, the athlete record corresponding to the athlete assessment project, wherein each athlete on the team has at least one associated objective and at least one associated subjective scored assessment attribute per the athletic project; and
   a subset of the assessment attribute records, created and modified by an assessment attribute record administration module a project identifier of the athletic project that includes the related athlete to the team of the athletic project and
   a client device having a user interface, the client device is connected to the server;
   a client interface module comprising instructions for the server to interact with the client device via the network interface, and wherein the athletic assessment database having bidirectional communication with the client device using the client interface module; and
   an administration interface module configured to interact with a user via the user interface of the client device.

2. The athlete assessment system of claim 1 wherein the network interface is a wireless network and client device is a wireless device.

3. The athlete assessment system of claim 1 wherein more than one athlete assessment project to be administered simultaneously.

4. The athlete assessment system of claim 1 wherein the athletic assessment database further comprises a plurality of assessment template records, each comprising the necessary project parameters to allow the systemized selection and creation of project records in the athlete assessment database based upon preset system settings, wherein an operator could rapidly and consistently create multiple project records for similar athlete assessment projects for similar groups of athletes and similar sports.

5. The athlete assessment system of claim 1 further comprising
   an independent evaluator interface configured to facilitate the capture of subjective assessment attributes from a plurality of independent human evaluators to network-connected client devices of affiliated independent human evaluators.

6. The athlete assessment system of claim 5 wherein the independent evaluator interface configured to display identifying athlete particulars of multiple athletes to the independent human evaluators at the time of capture and entry of the subjective assessment attributes.

7. An athlete assessment method, comprising:
   providing an athlete assessment system, comprising:
      one or more processors;
      a server, the server comprising the one or more processors;
      a network interface, the network interface is operatively connected to the server;
      one or more memories;
      athletic assessment software having one or more subroutines;
   one or more computer-readable hardware storage devices, the one or more computer readable hardware storage devices contain program code executable by the one or more processors via the one or more memories to implement instructions corresponding to the athletic assessment software;
   a database administration module;
   an athletic assessment database of records, administered by the one or more subroutines of the database administration module of the athletic assessment software, in communication with the server and comprising:
   an assessment template record, created and administered by a template record administration module, to report from the athletic assessment database, the assessment template record to retain project parameter data, the assessment template record to correspond to an athlete assessment project that enables a selection of an athletic team and members thereof from an available talent pool;
   a plurality of attribute records, each being linked in the athlete assessment database to a specific athlete record for a specific athlete, each containing a captured assessment attribute of the specific athlete to which it relates, wherein captured assessment attributes comprise objective assessment attributes and subjective assessment attributes, wherein each objective assessment attribute is a quantifiable measurement of performance of the athlete or of a physical attribute of the athlete relevant to participation on the athletic team, wherein each subjective assessment attribute is subjectively determined by at least one human evaluator with experience in a sport for which the athletic team competes, wherein for the athletic assessment project each athlete of the athletic team associated with the project has the related assessment attributes for that athlete scored based on normalizing the attributes specific to that athlete across all related attribute records of the athletic assessment database;

a plurality of athlete records, created and administered by an athlete record administration module, the athlete records each having an athlete identifier that corresponds to athlete identifying information, the athlete record corresponding to the athlete assessment project, wherein each athlete on the team has at least one associated objective and at least one associated subjective scored assessment attribute per the athletic project; and a subset of the assessment attribute records, created and modified by an assessment attribute record administration module linked to a project identifier of the athletic project that includes the related athlete to the athletic team of the athletic project; and a reporting module to conduct normalization of the captured attribute value;

a client device having a user interface, the client device is connected to the server;

a client interface module comprising instructions for the server to interact with the client device via the network interface, and wherein the athletic assessment database having bidirectional communication with the client device using the client interface module; and an administration interface module configured to interact with a user via the user interface of the client device;

creating, for each new athlete assessment project, a project record containing the project parameters of the project; and creating a plurality of athlete records linked to the project record each corresponding to an athlete to be compared in the project;

using an athlete assessment software component on the server during an athlete assessment step of the athlete assessment project and a corresponding project record for receiving objective attribute data transmissions at the server from the client device, and wherein each objective attribute data transmission corresponding to at least one captured objective assessment attribute of an athlete required in the corresponding project record and storing the data in a corresponding assessment attribute record linked to the corresponding project record and athlete record;

serving an independent evaluator interface for facilitating the capture of subjective assessment attributes from the independent human evaluators to network-connected client devices of the affiliated independent human evaluators;

receiving subjective attribute data transmissions at the server from the client device of the affiliated independent human evaluators, each subjective attribute data transmission corresponding to at least one captured subjective assessment attribute of an athlete personally judged by the affiliated independent human evaluator as required in the associated project record, and storing said data in a corresponding assessment attribute record linked to the corresponding project record and athlete record; and wherein the athlete assessment step of the athlete assessment project will not be completed until:

objective attribute data transmissions have been received and assessment attribute records have been created for each objective assessment attribute of each athlete linked to the project; and subjective attribute data transmissions have been received from each of the affiliated plurality of independent evaluators outlined in the corresponding project record for each subjective assessment attribute of each athlete linked to the project and corresponding assessment attribute records have been created; and following conclusion of the athlete assessment step, in a display step:

selecting assessment attribute records corresponding to at least one objective or subjective assessment attribute outlined in the corresponding project record for all linked athletes from the database; and displaying the stored assessment attribute values from the selected assessment attribute records to a user via the human interface of a client device in communication with the server;

wherein each of the plurality of independent evaluators associated with a project and project record is unaffiliated with any athlete associated with the project; and wherein the independent evaluator interface enforces standardized data entry for each of the plurality of independent evaluators in respect of each athlete and each subjective assessment attribute judged in a project.

8. The athlete assessment method of claim 7 wherein the display step comprises generating at least one ranked listing of the athletes in the project based on the assessment attribute values from attribute records corresponding to the related project record.

9. The athlete assessment method of claim 7 wherein the client device used by an independent evaluator is a wireless device capable of two-way communication with the server via the computer network.

10. The athlete assessment method of claim 7 wherein the independent evaluator interface comprises a user interface by which identifying athlete particulars from athlete records can be viewed for identification purposes, and the subjective assessment attributes as judged by the independent evaluator can be entered through a data entry form for transmission to the server in a subjective attribute data transmission.

11. The athlete assessment method of claim 7 wherein the number of project records is more than one.

12. The athlete assessment method of claim 7 wherein the identifying athlete particulars contain physical identification of an athlete, to ease identification of the athlete during the assessment stage of the athlete assessment project.

13. The athlete assessment method of claim 7 wherein the athlete assessment database further comprises a plurality of assessment template records each containing the necessary project parameters to allow the creation of project records in the athlete assessment database based upon preset system settings, wherein an operator could rapidly and consistently create multiple project records for similar athlete assessment projects for similar groups of athletes and similar sports.

14. The athlete assessment method of claim 7 wherein the display step facilitates the drafting of a plurality of sports teams by a plurality of coaches by:

displaying the stored assessment attribute values from the selected assessment attribute records to the plurality of coaches via the human interface of their client devices; and exclusively assigning athletes assessed in the project to one of the plurality of teams by permitting individual coaches to select athletes for their individual teams, wherein upon selection of an athlete by a coach to a particular team the display of the client devices of the coaches participating is updated to remove the selected athletes from the available athletes in the draft.

15. The athlete assessment method of claim 10 wherein the independent evaluator interface provides viewing and data entry access in respect of multiple athletes at the same time.

16. The athlete assessment method of claim 11 wherein an athlete record is linked to more than one project record.

17. The athlete assessment method of claim 11 wherein the independent evaluator interface allows the evaluator to select the correct athlete assessment project and related dataset for viewing and data entry.

18. A non-transitory computer-readable storage medium being an athlete assessment software program, the computer-readable storage medium including instructions that when executed by a server operatively connected to a computer network, enable the server to facilitate an athlete assessment method for the comparison of subjective assessment attributes of a plurality of athletes in an athlete assessment project judged by a plurality of independent human evaluators, by:

administrating, by one or more subroutines of a database administration module of the athlete assessment software program, an athletic assessment database of records in communication with the server and comprising:

an assessment template record, created and administered by a template record administration module, to report from the athletic assessment database, the assessment template record to retain project parameter data, the assessment template record to correspond to an athlete assessment project that enables a selection of an athletic team and members thereof from an available talent pool or enables enhanced assessment of the athletic team and members thereof;

a plurality of attribute records, each being linked in the athlete assessment database to a specific athlete record for a specific athlete, each containing a captured assessment attribute of the specific athlete to which it relates, wherein captured assessment attributes comprise objective assessment attributes and subjective assessment attributes, wherein each objective assessment attribute is a quantifiable measurement of performance of the athlete or of a physical attribute of the athlete relevant to participation on the athletic team, wherein each subjective assessment attribute is subjectively determined by at least one human evaluator with experience in a sport for which the athletic team competes, wherein for the athletic assessment project each athlete of the athletic team associated with the project has the related assessment attributes for that athlete scored based on normalizing the attributes specific to that athlete across all related attribute records of the athletic assessment database;

a plurality of athlete records, each created and administered by an athlete record administration module, the athlete records each having an athlete identifier that corresponds to athlete identifying information, the athlete record corresponding to the athlete assessment project, wherein each athlete on the team has at least one associated objective and at least one associated subjective scored assessment attribute per the athletic project; and a subset of the assessment attribute records, created and modified by an assessment attribute record administration module linked to the a project identifier of the athletic project that includes the related athlete to the team of the athletic project; and a reporting module to conduct normalization of the captured attribute value;

creating, for each new athlete assessment project, a project record containing the project parameters of the project; and creating a plurality of athlete records linked to the project record each corresponding to an athlete to be compared in the project;

using an athlete assessment software component on the server during an athlete assessment step of the athlete assessment project and a corresponding project record for receiving objective attribute data transmissions at the server from the client device, and wherein each objective attribute data transmission corresponding to at least one captured objective assessment attribute of an athlete required in the corresponding project record and storing the data in a corresponding assessment attribute record linked to the corresponding project record and athlete record;

serving an independent evaluator interface for facilitating the capture of subjective assessment attributes from the independent human evaluators to network-connected client devices of the affiliated independent human evaluators;

receiving subjective attribute data transmissions at the server from the client device of the affiliated independent human evaluators, each subjective attribute data transmission corresponding to at least one captured subjective assessment attribute of an athlete personally judged by the affiliated independent human evaluator as required in the associated project record, and storing said data in a corresponding assessment attribute record linked to the corresponding project record and athlete record; and wherein the athlete assessment step of the athlete assessment project will not be completed until:

objective attribute data transmissions have been received and assessment attribute records have been created for each objective assessment attribute of each athlete linked to the project; and subjective attribute data transmissions have been received from each of the affiliated plurality of independent evaluators outlined in the corresponding project record for each subjective assessment attribute of each athlete linked to the project and corresponding assessment attribute records have been created; and following conclusion of the athlete assessment step, in a display step:

selecting assessment attribute records corresponding to at least one objective or subjective assessment attribute outlined in the corresponding project record for all linked athletes from the database; and displaying the stored assessment attribute values from the selected assessment attribute records to a user via the human interface of a client device in communication with the server;

wherein each of the plurality of independent evaluators associated with a project and project record is unaffiliated with any athlete associated with the project; and wherein the independent evaluator interface enforces standardized data entry for each of the plurality of independent evaluators in respect of each athlete and each subjective assessment attribute judged in a project.

19. The athlete assessment method of claim 18 wherein the project record further defines at least one objective assessment attribute in respect of athletes in the project for storage and use in the display step.

20. The athlete assessment method of claim 18 further comprising a normalization function removes evaluator bias from the dataset of captured attribute values in respect of a project.

* * * * *